United States Patent [19]
Zulch

[11] Patent Number: 5,150,473
[45] Date of Patent: Sep. 22, 1992

[54] DATA STORAGE FORMAT FOR ADDRESSABLE OR SEQUENTIAL MEMORY MEDIA

[75] Inventor: Richard C. Zulch, Berkeley, Calif.

[73] Assignee: Dantz Development Corporation, Berkeley, Calif.

[21] Appl. No.: 466,145

[22] Filed: Jan. 16, 1990

[51] Int. Cl.⁵ .............................................. G06F 12/16
[52] U.S. Cl. .............................. 395/425; 364/DIG. 1; 364/DIG. 2
[58] Field of Search ... 364/200 MS File, 900 MS File; 395/400 MS File, 425 MS File

[56] References Cited

U.S. PATENT DOCUMENTS

| | | | |
|---|---|---|---|
| 4,291,388 | 9/1981 | Ecker, Jr. et al. | 364/200 |
| 4,604,699 | 8/1986 | Borcherdt et al. | 364/200 |
| 4,945,475 | 7/1990 | Bruffey et al. | 364/200 |
| 5,008,820 | 4/1991 | Christopher et al. | 364/200 |
| 5,053,945 | 10/1991 | Whisler | 364/200 |

*Primary Examiner*—Joseph L. Dixon
*Assistant Examiner*—Reba I. Elmore
*Attorney, Agent, or Firm*—Townsend and Townsend

[57] ABSTRACT

A data archive format is disclosed for archiving computer information taken from computer sessions, each session being of the form that includes a so-called "root directory" with appropriate branches leading to each discrete file or subfile within the computer session. The archive format includes the transfer of data to an archive media member, which archive media member can alternatively be addressable or sequential memory and can be recordable in either a rewriteable or right once manner. When data is archieved, a separate and resident archived directory is created in the immediate memory of the computer having data to be archived, the purpose of this separate and resident directory being to maintain high speed during reading and writing of the archived data. This separate and resident archive directory is updated during the archiving process, used to access and retrieve the archived data during the recovery process, and distributed through the archive media in a nonpredictive, largely nonredundant but recoverable format so that upon failure of the memory containing the separate and resident archive directory, reconstruction of the separate and resident archive directory is possible.

13 Claims, 19 Drawing Sheets

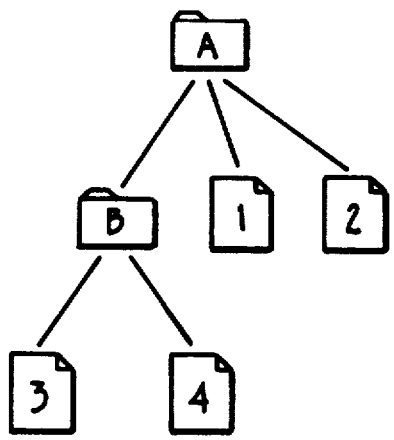
FIG._1. PRIOR ART
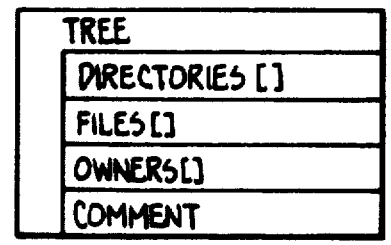
FIG._2.
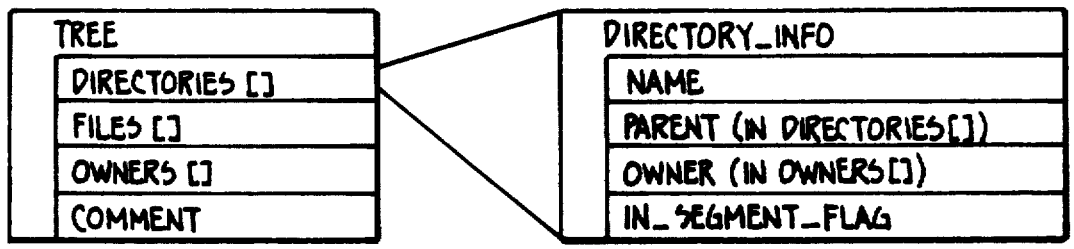
FIG._3.
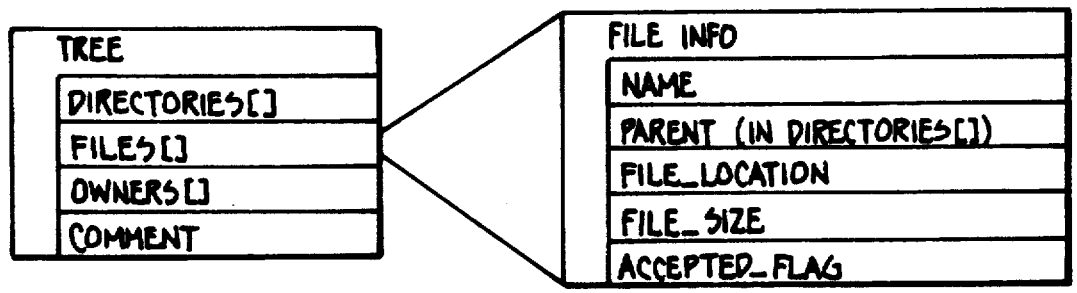
FIG._4.
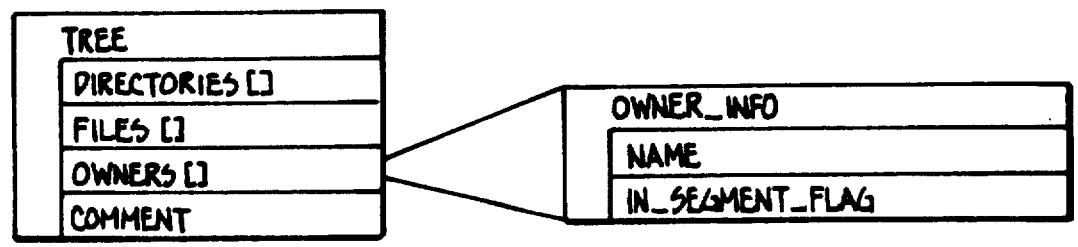
FIG._5.

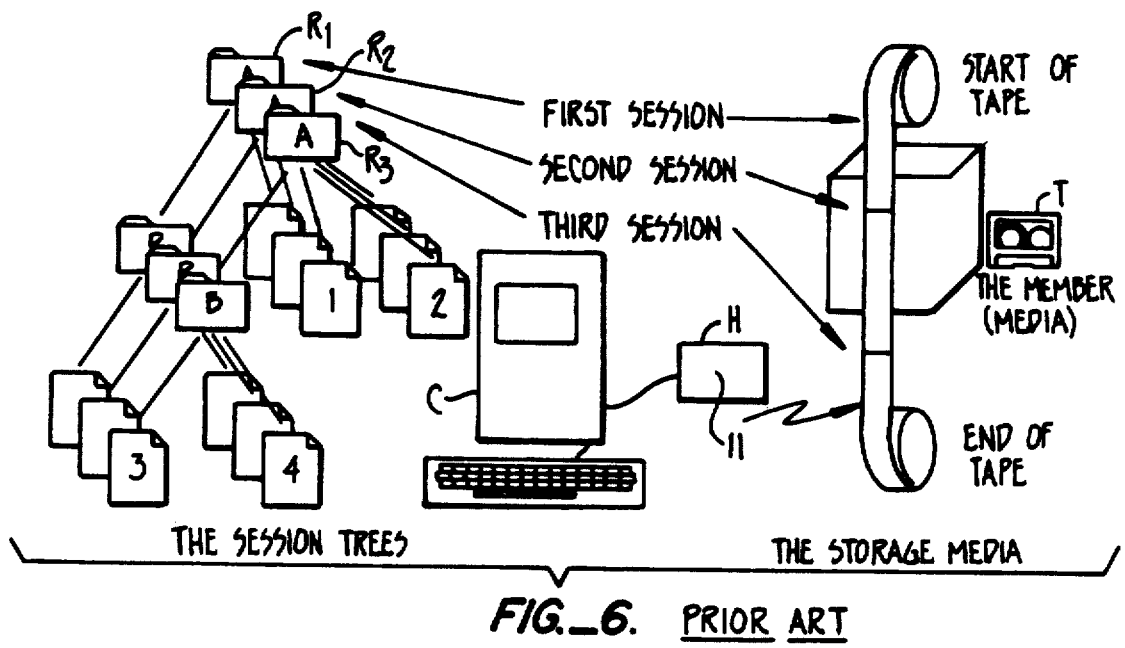
FIG._6. PRIOR ART
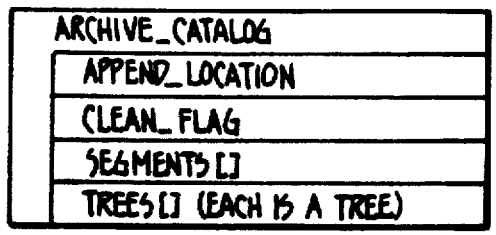
FIG._7.
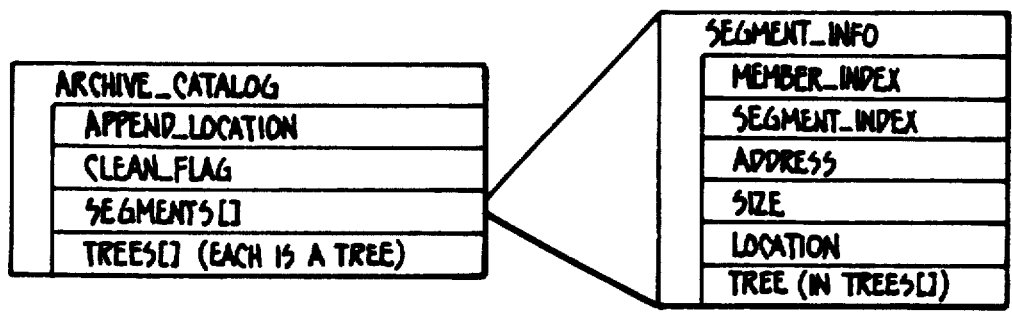
FIG._8.

ARCHIVING_INFO
- ARCHIVE (AN ARCHIVE_CATALOG)
- SOURCE (A TREE)
- TREE (IN ARCHIVE_CATALOG)
- SESSION_FILES[]
- CURRENT_FILE
- CURRENT_OFFSET
- CURRENT_ADDRESS
- FREE_SPACE
- RESTART_CHECKPOINT
- CHECKPOINTS[]
*FIG._9.*
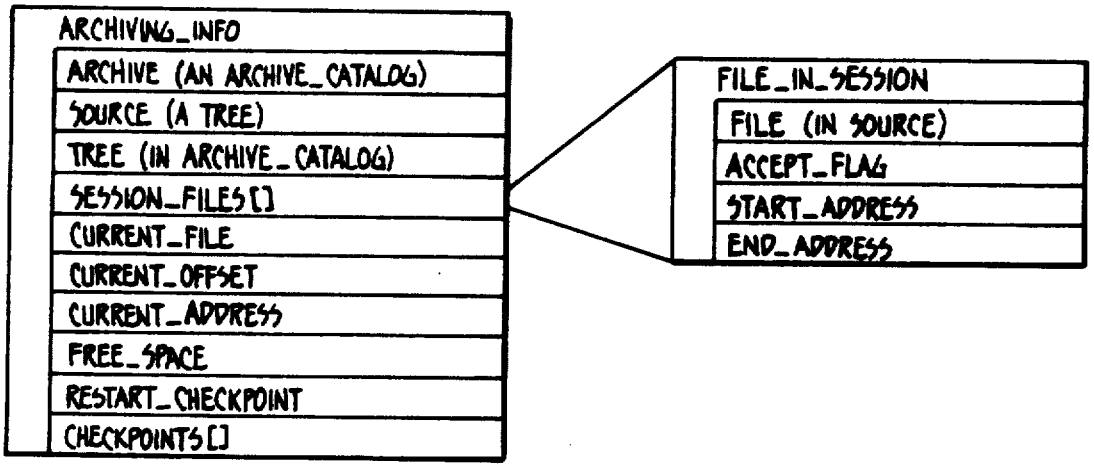
*FIG._10.*
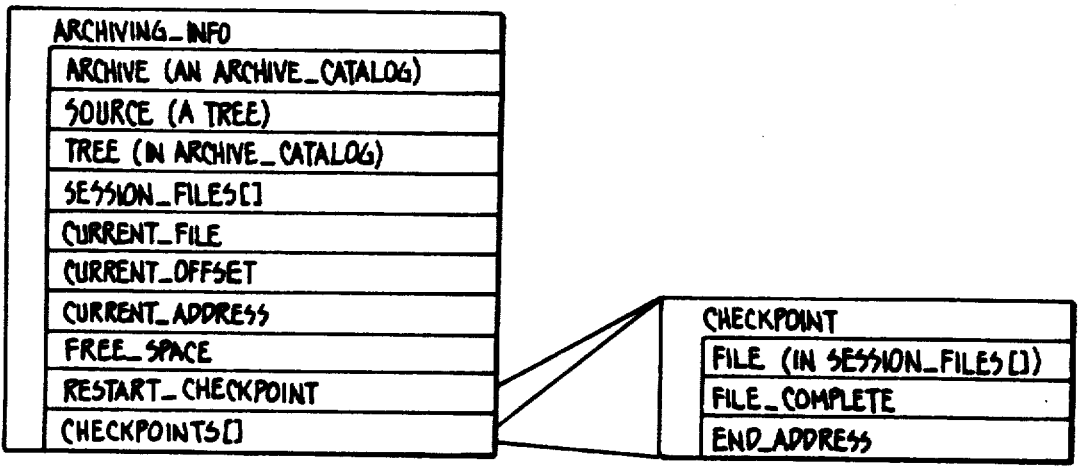
*FIG._11.*

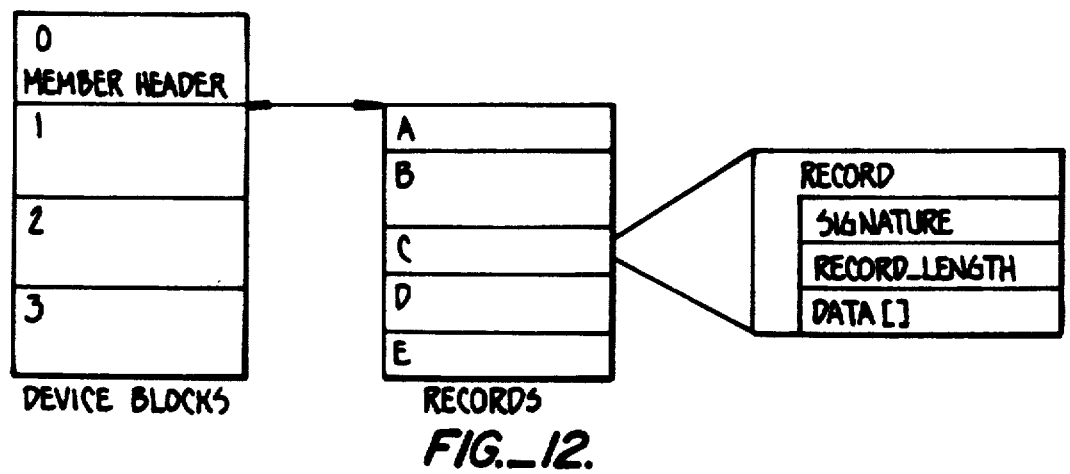
FIG._12.
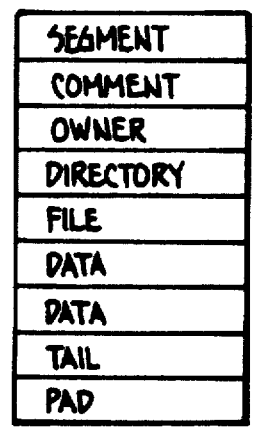
FIG._13.
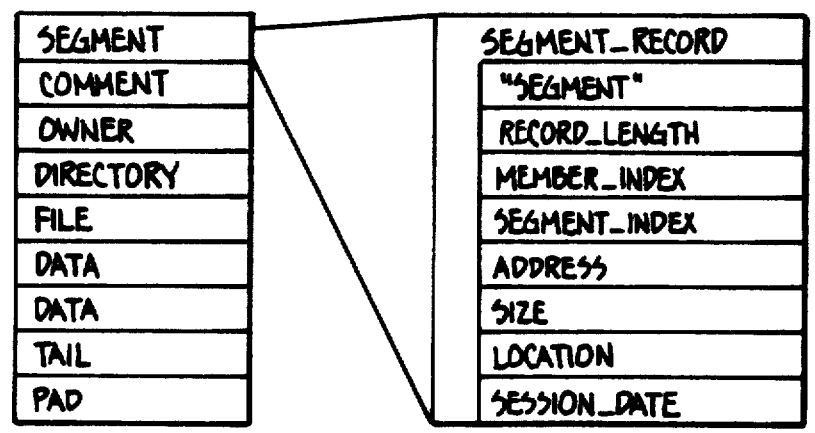
FIG._14.

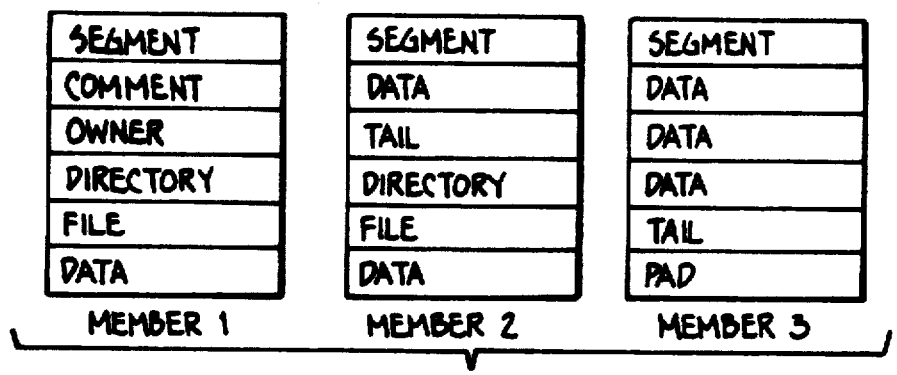

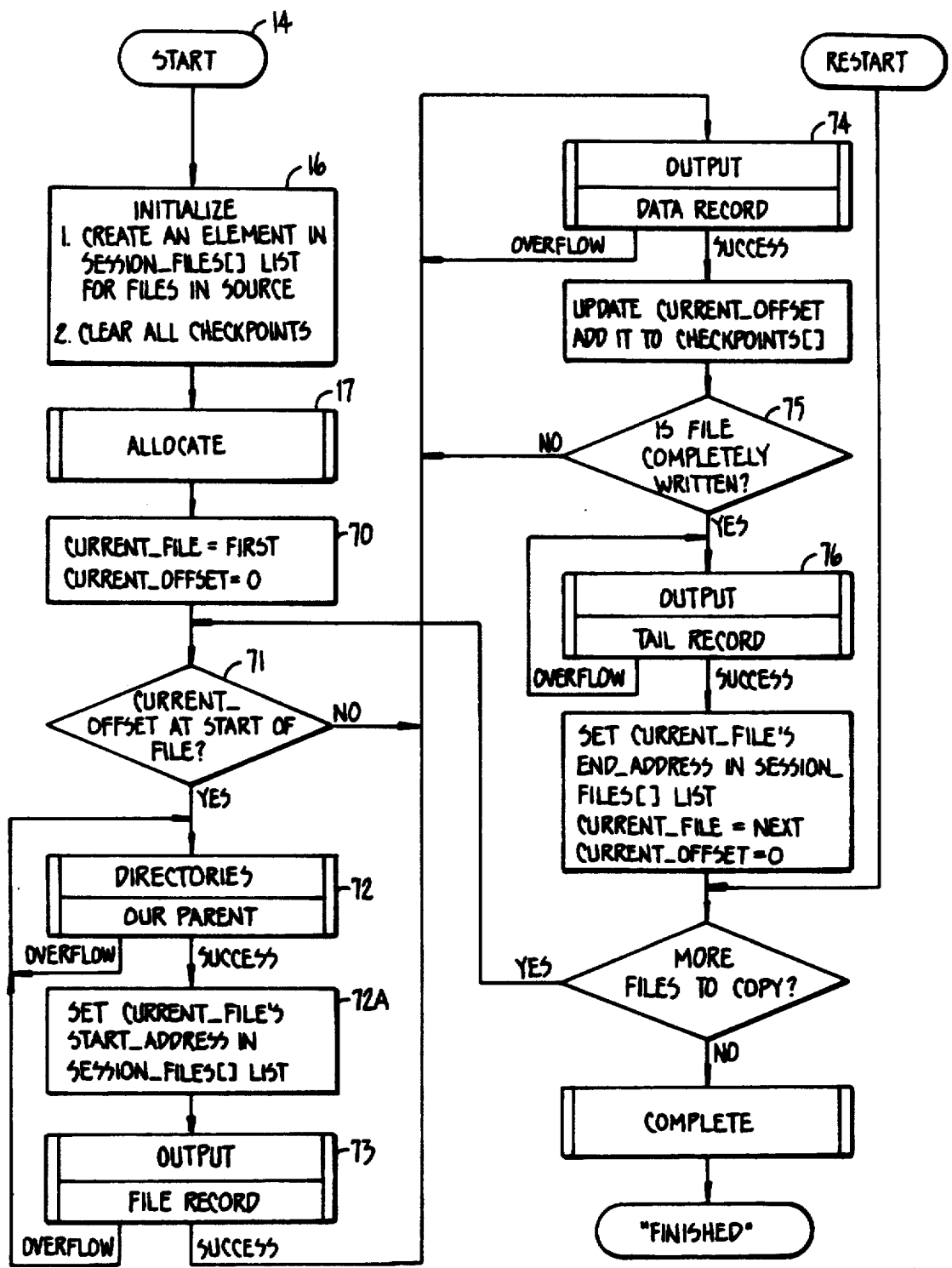
FIG._17.

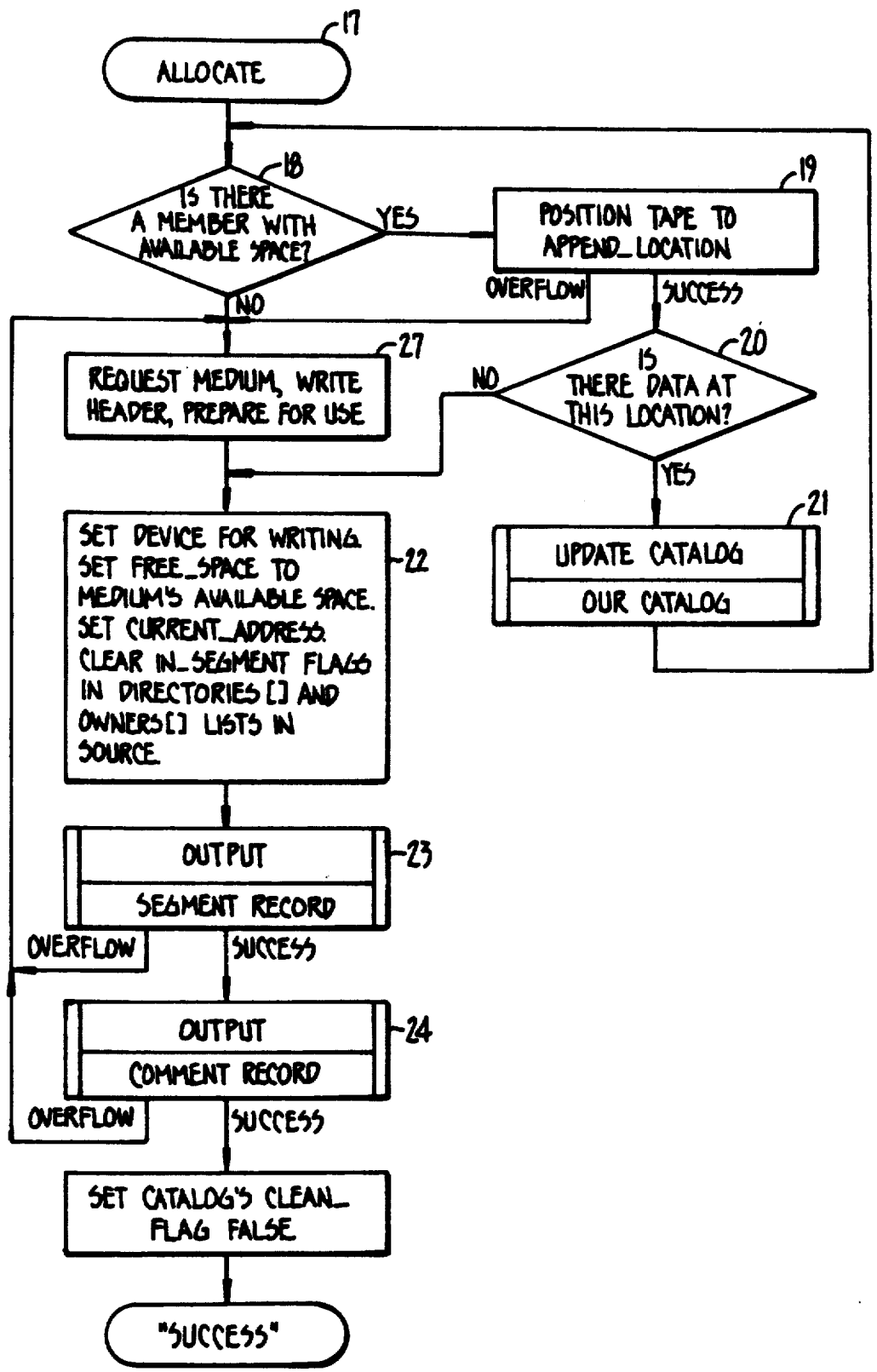
FIG._18.

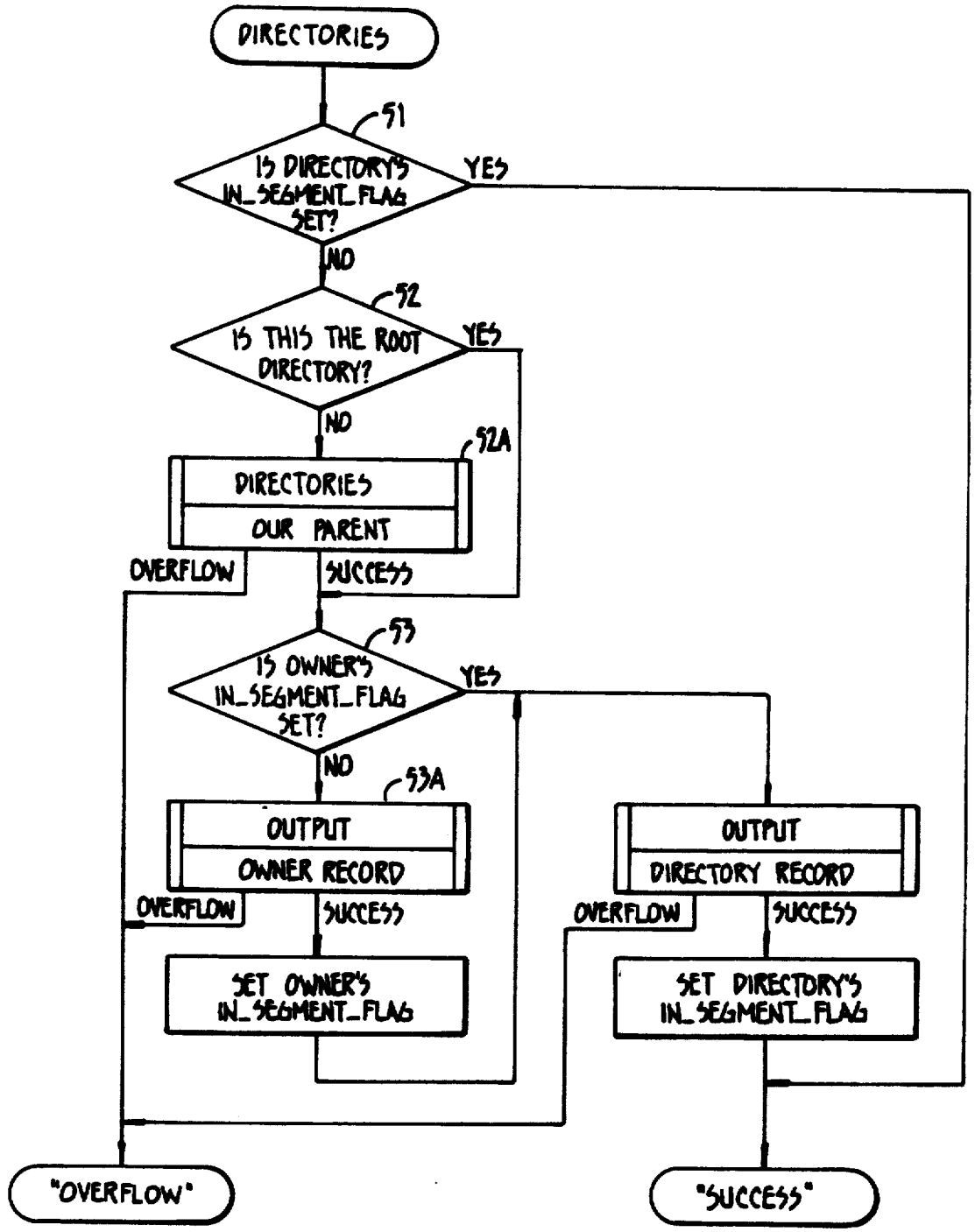
FIG._19.

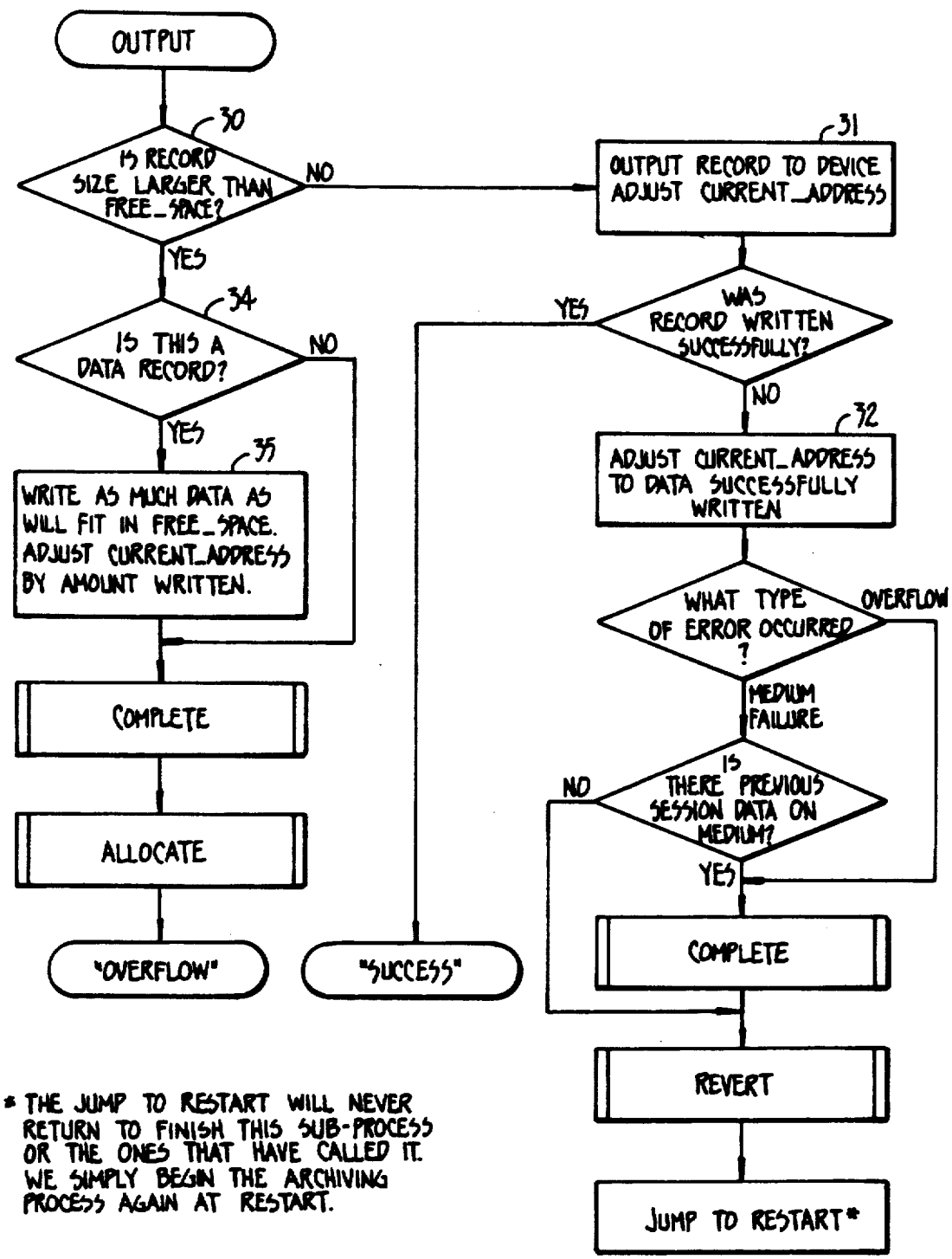
FIG._20.

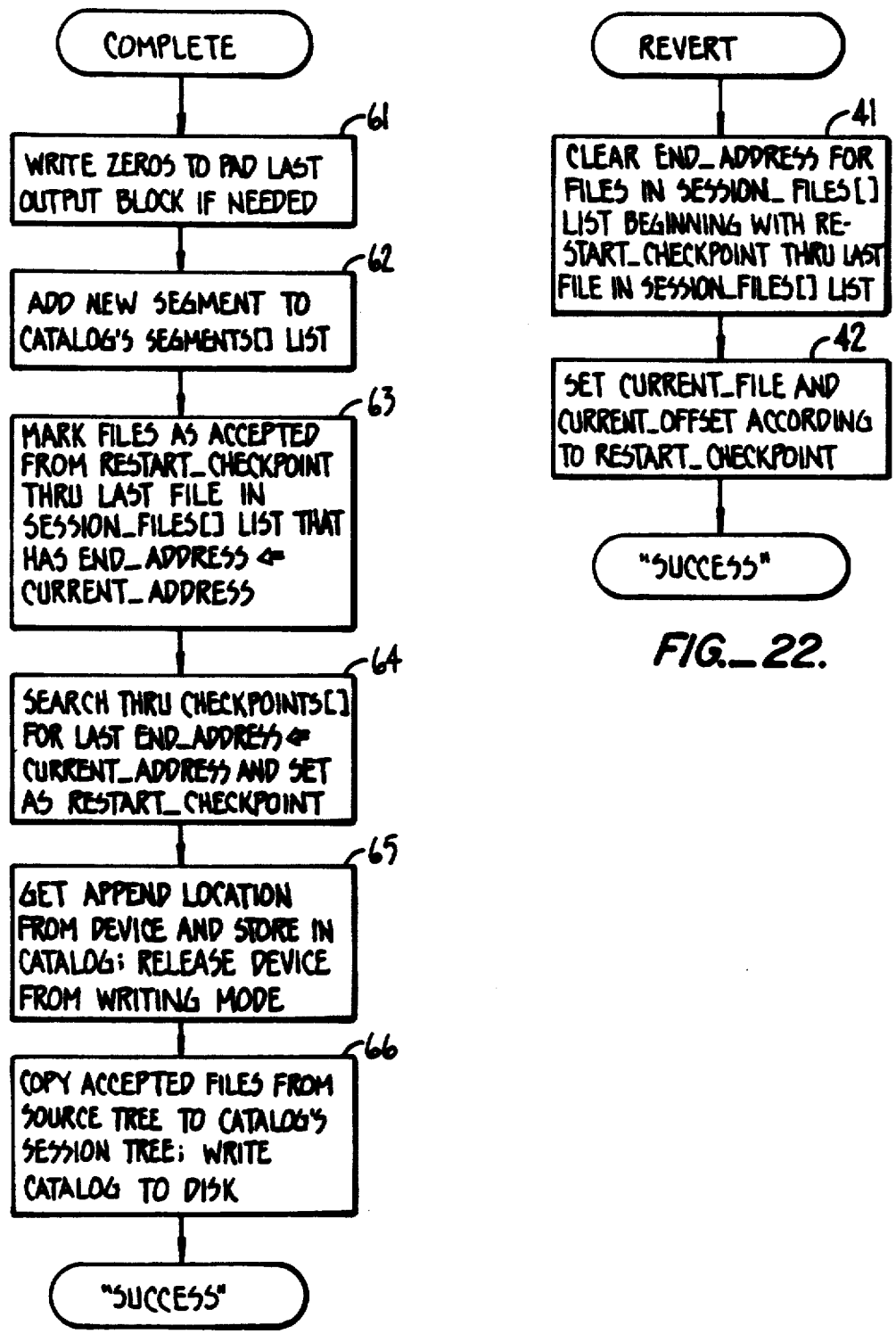

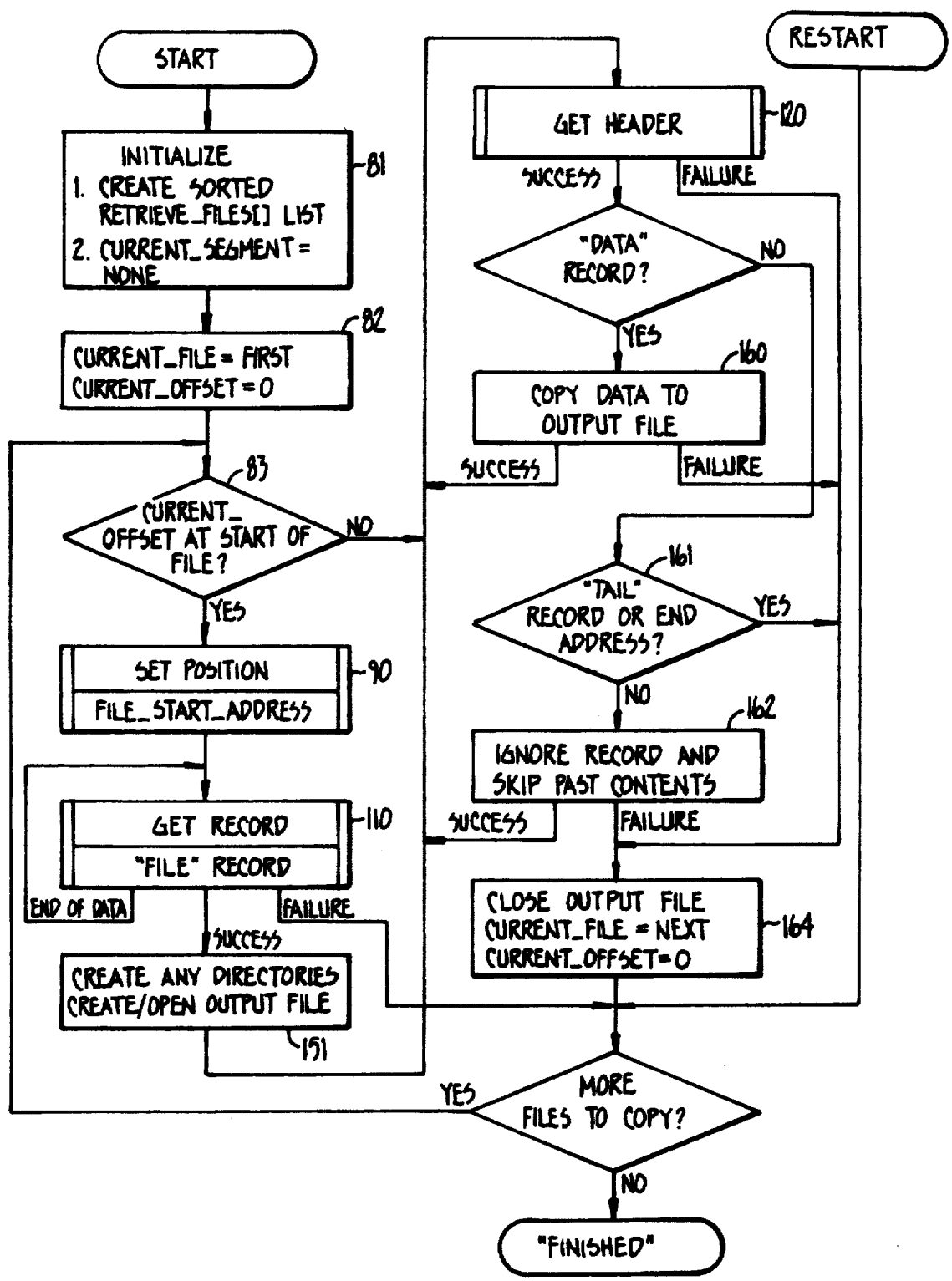
FIG._23.

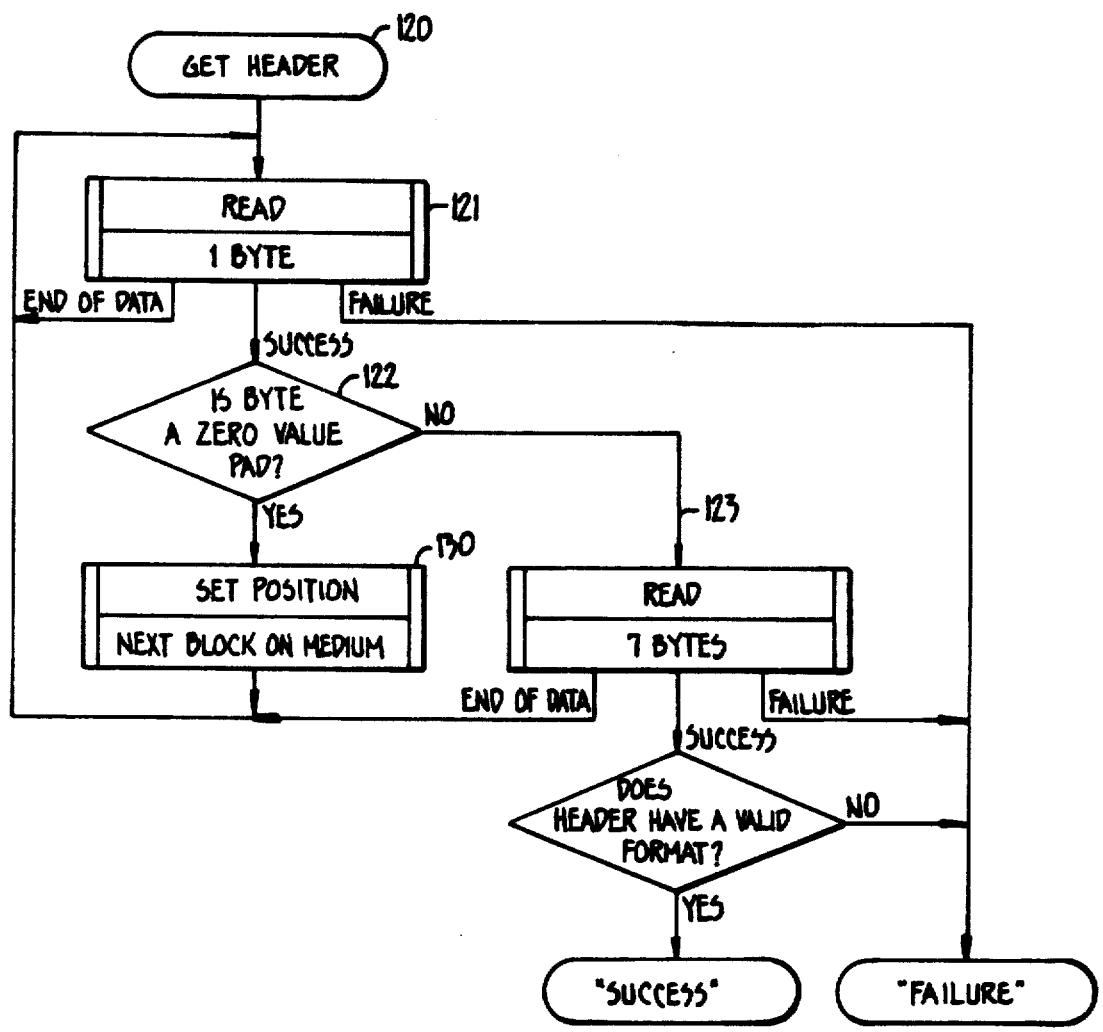
FIG._24.

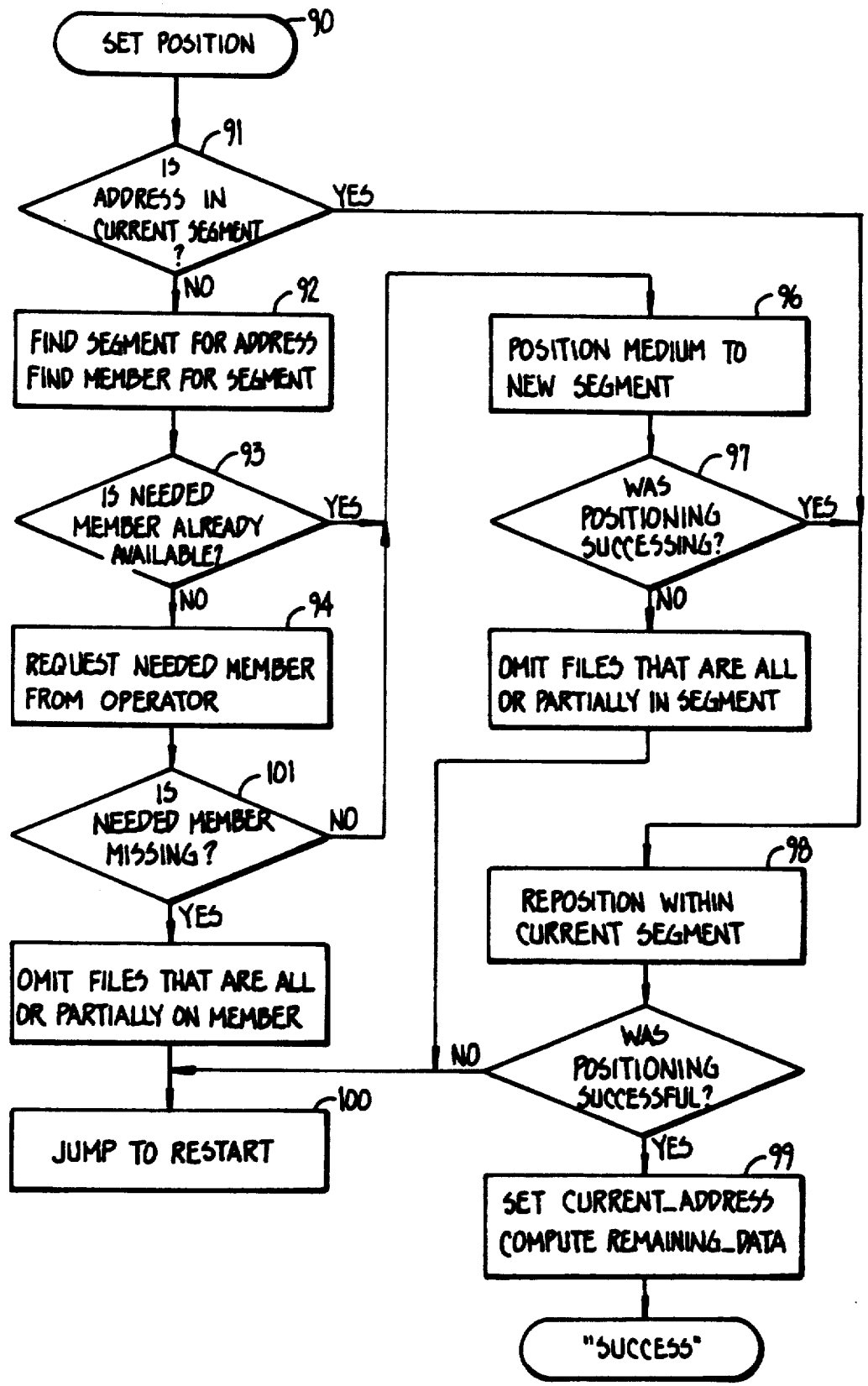
FIG._25.

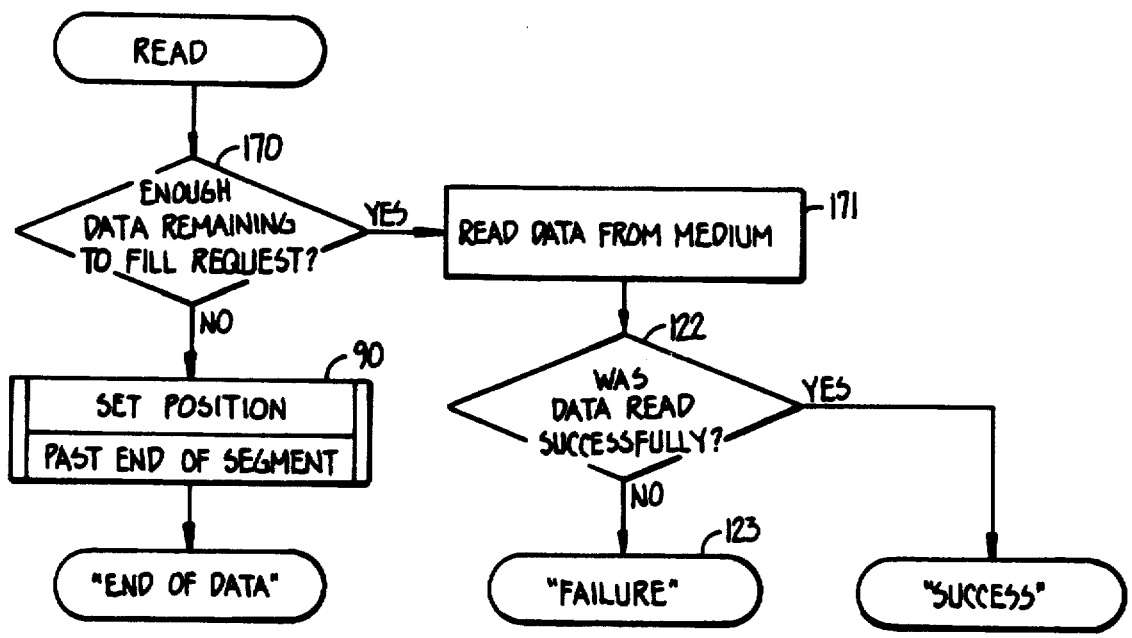
FIG._26.
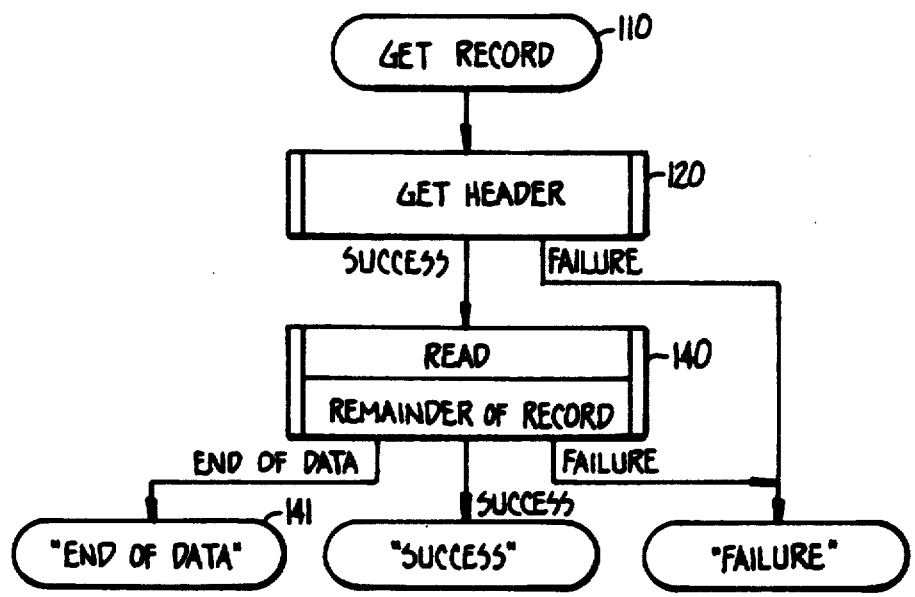
FIG._27.

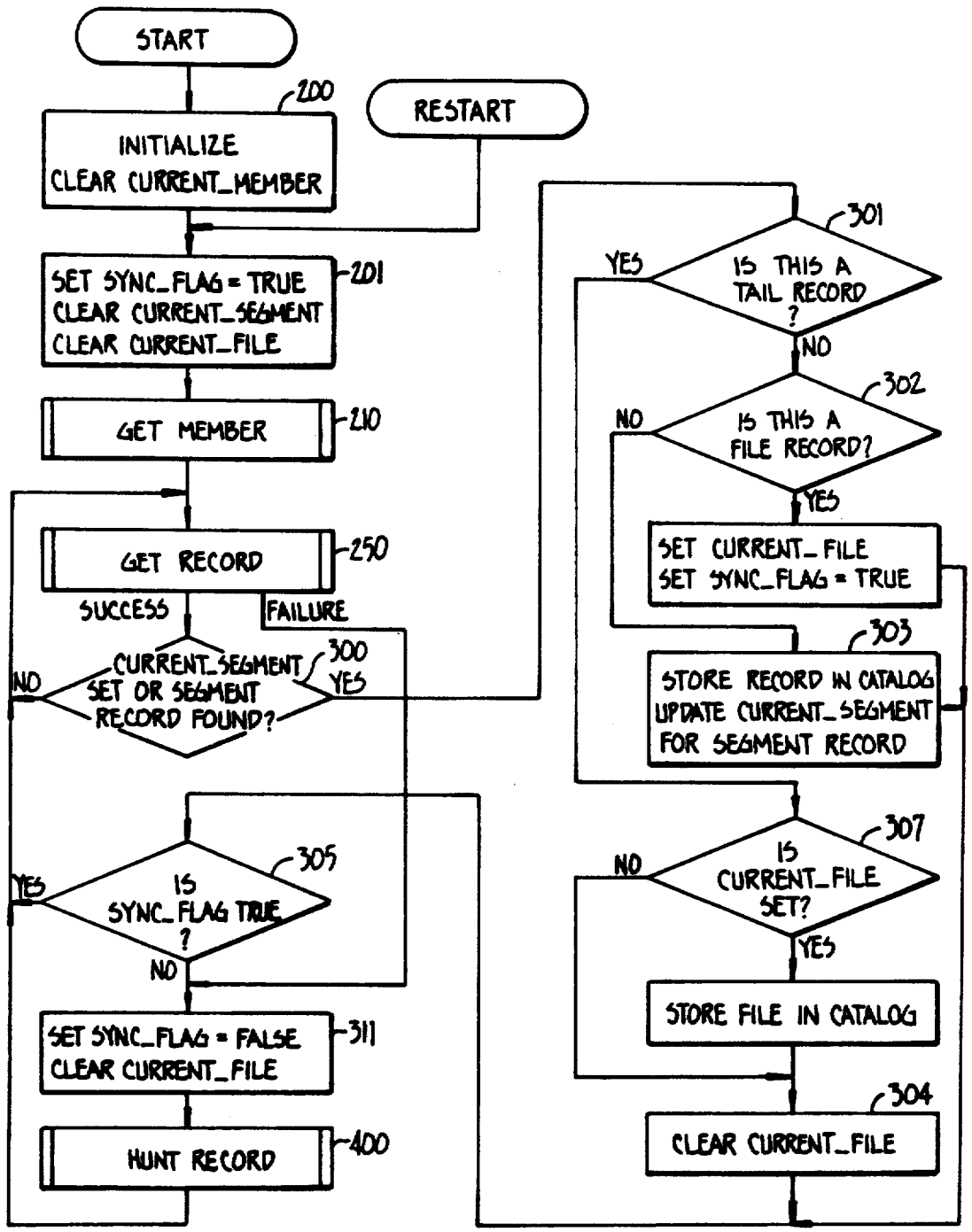
FIG._28.

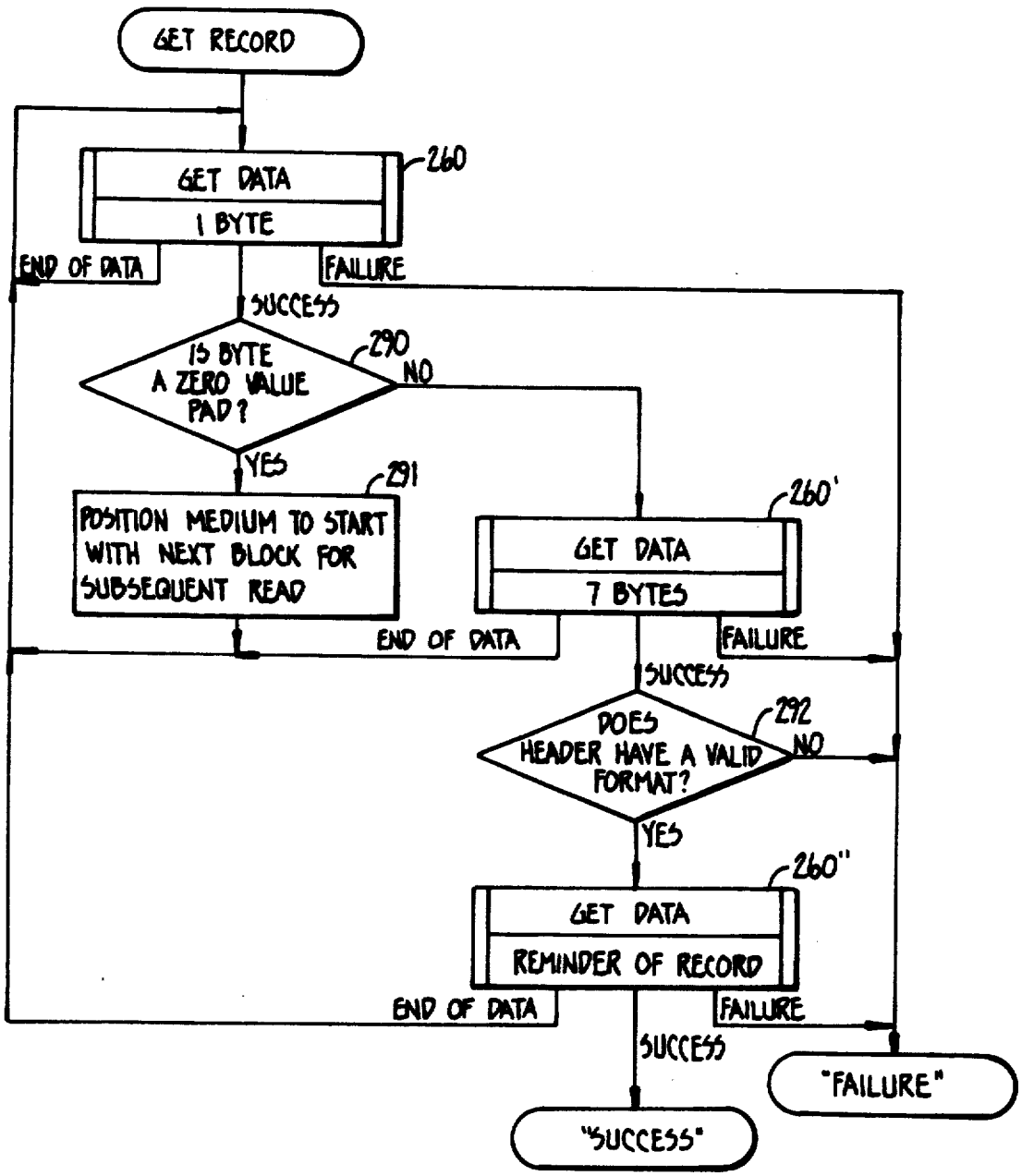
FIG._29.

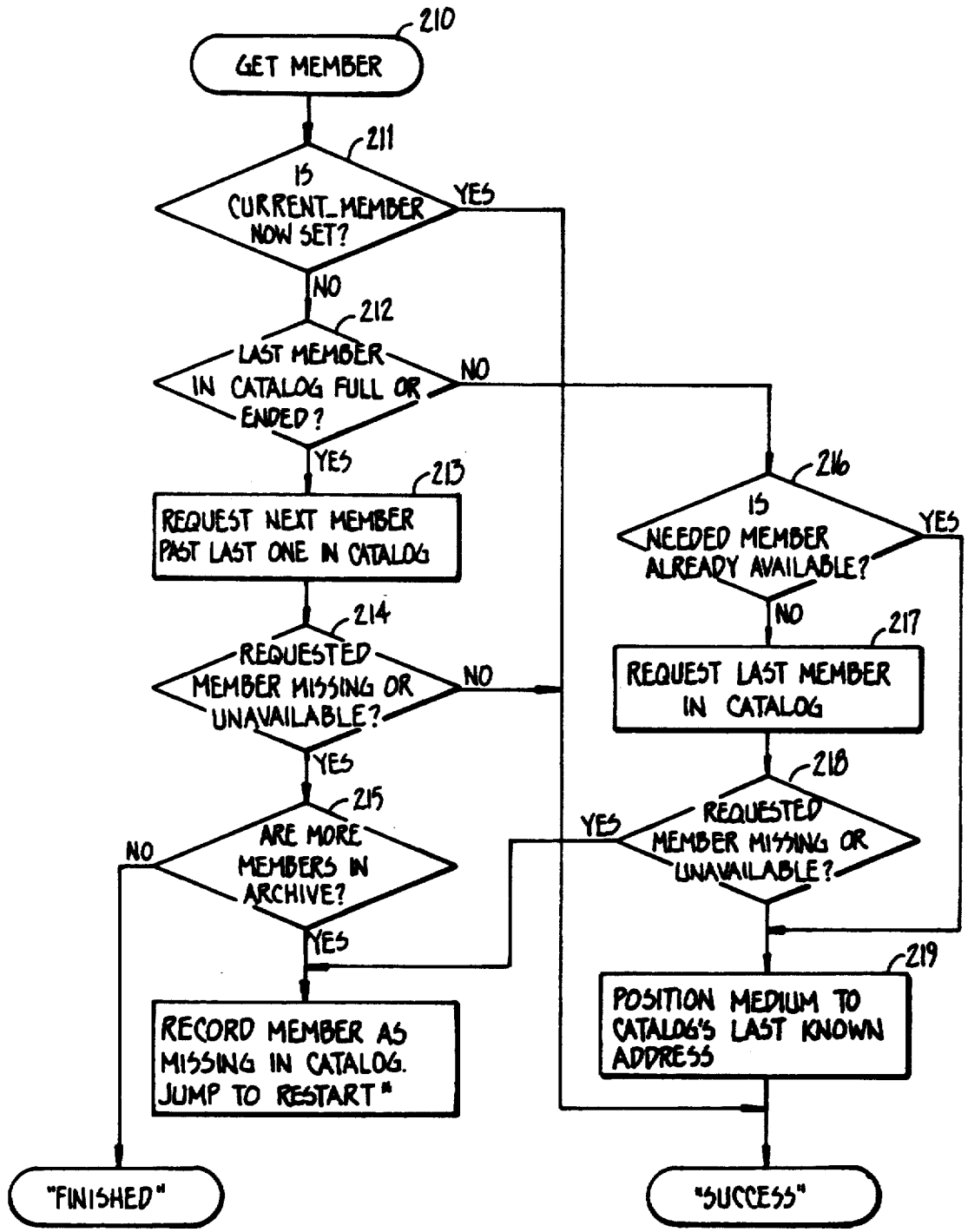
FIG._30.

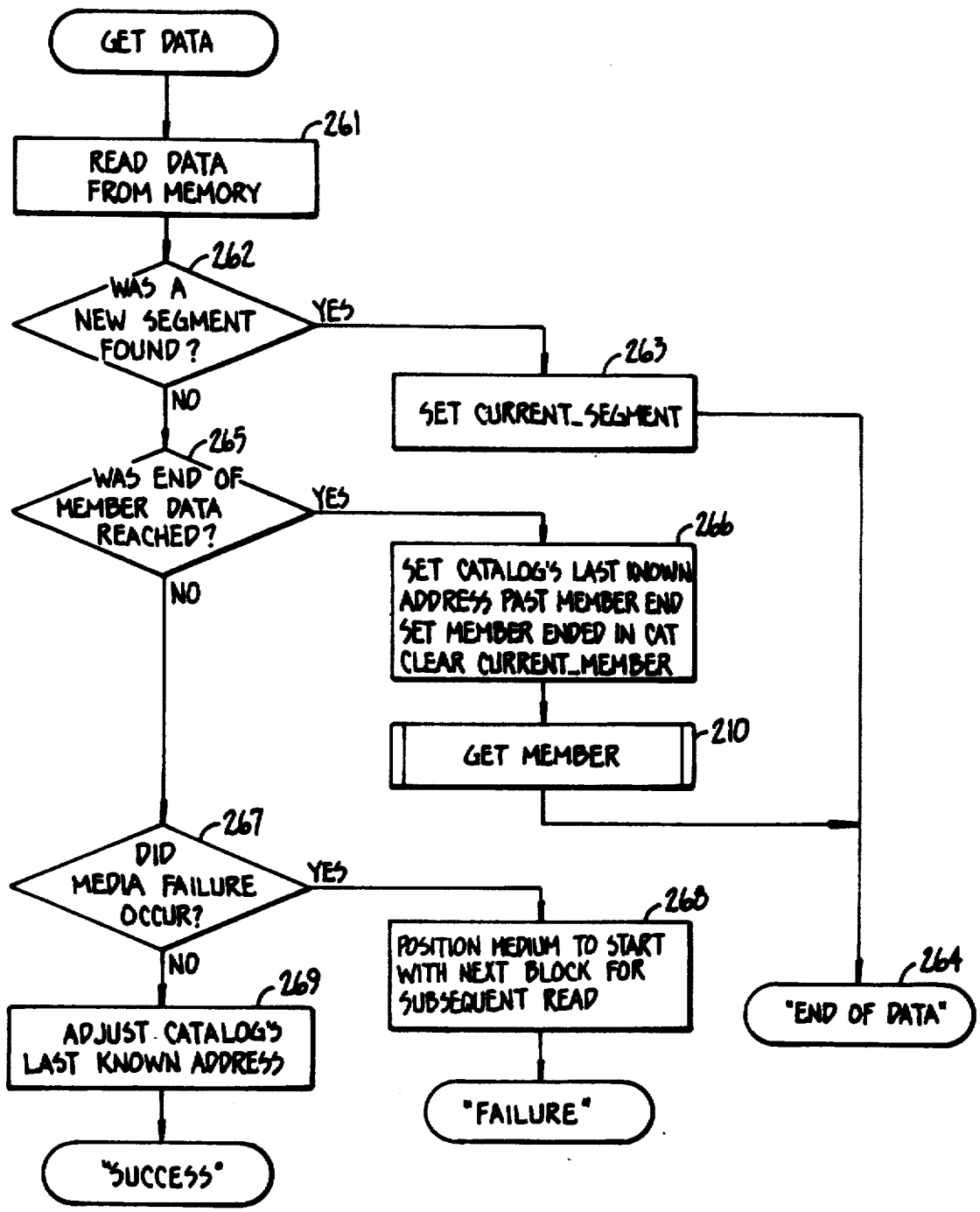
FIG._31.

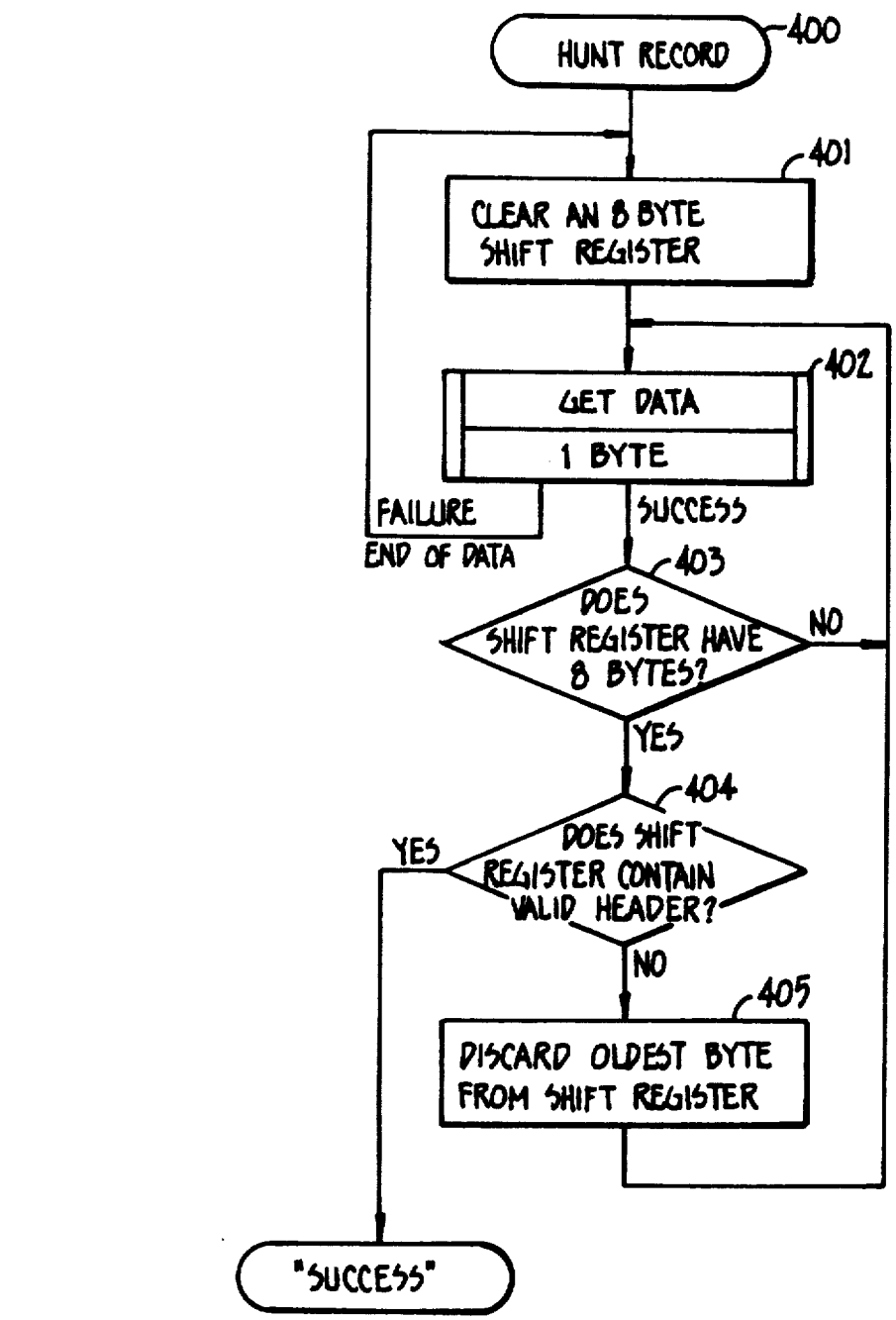
FIG.__32.

DATA STORAGE FORMAT FOR ADDRESSABLE OR SEQUENTIAL MEMORY MEDIA

BACKGROUND OF THE INVENTION

1. Field of the Invention

This patent application relates to computer data storage. More particularly, a protocol is disclosed for archiving data in a format that is compatible to addressable (direct access) or sequential membrane media possessing either rewriteable or write once capability.

2. Brief Description of the Relevant Art

The archiving of data from computer assumes importance as a modern safety device. Computer use begets files which are valuable records. Unfortunately, resident computer storage size can easily be exceeded. Furthermore, storage can be damaged or lost. With the damage or loss of storage there can likewise be data loss that is impossible to recreate. It is against this data loss that the regular archiving of computed data forms an indispensable part of even the most ordinary computer operational discipline. Any data loss with a sufficient archive device should be minimized through regular and recurrent use of the archive device.

Prior art archive devices come in discrete formats. These formats can include sequentially accessible devices as well as addressable (direct access) devices. An example of a sequentially accessible device is a magnetic tape having file marks. An example of an addressable device is the formatted floppy disks utilized with many personal computers.

The reader will understand that certain block addressable tapes constitute a confusing situation for distinguishing so-called "direct access" from the serial access devices. Technically speaking, and because of the previously formatted tapes and their respective blocks, a block addressable tape is a direct access device. The media, however, is undeniably serial. Even though the addressing scheme tells the computer exactly where the tape has the data, the tape must serially move to the location of the data.

Such prior art devices also possess either write once or rewriteable capability. As an example, a write once device can include an optical memory. Even though many serially read tapes can be rewritten from the beginning, their serial access capability often renders these devices write once in character as a practical manner. Rewriteable devices are well known and include all sorts of random access disks and memories.

In the prior art, archiving protocols have been designed to the specific media for which the information is directed. For example, in the case of a tape backup, the usual format has included making the archiving process compatible to a serial access, write once, type of device. Regarding such backup tape drives, it has been the usual case in such serial devices to record the directory for the archiving of data in one portion of the tape and to place the data itself in a remaining (and usually trailing) portion of the tape. This being the case, several known disadvantages have followed.

First, the leading portion of the tape usually contains not only identifier and directory information, but it also contains so-called header information. Such header information can be said to be predictive—it tells devices accessing the serial tape about the location and length of the serial data following the header which serial data comprises the body or content of the file.

Such a header is time consuming to access. Further, and in the event that the media containing the header becomes unreadable, the indicated data usually becomes hopelessly lost. Such machines can usually easily be recognized when given a data location task. They start, traverse at high speed to the header, slow and read or write the header, again traverse at high speed to the data, and finally slow and read or write the data. All of this starting and stopping, of course, consumes considerable time.

There are additional problems with these kinds of formats. Due to the inherent inability of sequential devices to exactly predict their eventual capacity, the directory for all files is often written to each unit of media. This can lead to large inefficiencies if, for example, a very large file relative to the media size follows the directory. Because not all intended files can be written to that medium, either the whole directory must be written again on the next tape or such subsequent media contain no catalog, preferring the importance of the first medium over the rest, with corresponding loss of safety. Complete directories written to each unit of media can lead to prohibitive inefficiencies.

Archiving formats of the prior art have presented another serious problem for the computer user. Typically for the archiving of a computer memory, long periods of time are consumed. These long periods of time require dedication of the computer to the archiving function. The computer is useless for other tasks while archiving is in process. Further, if it is necessary to interrupt the archiving process, some and usually all of the archived data is rendered nonrecoverable. This means that when the archiving is resumed, it must be resumed from the beginning as if it had never been started in the first instance.

It will be understood that where long periods of time are spent archiving, interruptions often are not voluntary. The system can crash. The power can be interrupted. The media of the hard disc can be locally invalid. In all of these cases, in most of the prior art protocols, archiving must begin again from the start. No provision is made for the preservation of what has been done.

The reason for the required restarting of the archiving operation can be understood. Such archiving formats usually include a header which header is written first. This header is either at the very beginning of the tape or at least at the very beginning of the discrete data constituting a file to be achieved. This header can usually be said to be predictive. It says (or predicts) that a certain number of blocks or certain distance behind the header contain file content.

Where the archiving process is arbitrarily terminated, data simply is not present where the "predictive" header said data would in fact be present. Further, and after the interruption of the data archiving, a further header is again written. This header is also followed by file data. Only, it will be understood that if the header written after archiving is started again it will typically be located in an area where the previously recorded header of the partially written file said that there would be resident data! Because of this previously recorded header of the partially written file, the last written header of the new file is not accessible. A hopeless mess results with the only solution being either the repeat of the archiving process from the beginning or the abandonment of the directory resident on the tape and manual recovery of the data.

Another technique is to place the directory at the end of the file. Unfortunately, in tapes this can be a most inconvenient technique. First, the end of the tape storage media can be reached before the recordation of the file occurs. In this case the directory must be placed on a second and following tape. For example, it may be necessary to read the entirety first tape, discover that there is no directory, read the second tape only to find out that the desired file remains on the first tape. Access to the archived file is slow.

To avoid this predictor header problem, special so-called "flags" or "file marks" have been recorded on serial media—such as tape drives. These file marks, however, have not been without their own disadvantages.

Where the flags or file marks are utilized in some serial devices, the device scans for the flag typically at a high speed. When the reading device encounters a "flag," the device stops from its high speed traverse and enters into a low speed "read" or "write" of the tape. The stops and starts of a serial tape drive in encountering the reading and responding to flags results in an aggregate intermittent and consequently slow operation of the archived media. This characteristic is particularly aggravated in so-called "streaming" tape drives. In order for such streaming tape drives to start and stop, many mechanical and data operations must be reset. Usually the tape must back up, reset certain data collection parameters and reenter into the streaming mode each time that a stop is called for. In short, the requirement of the intermittent stop for the recognition of flags quickly neutralizes any speed that the streaming tape drive acquired in the first place.

Flags also turn out to be generally unsuitable for addressable devices, a commonly used archiving format where blocks are numerically addressed. In such numerical addressing schemes, it makes no sense to have an incorporated flag.

Where so-called file marks have been used in all sequential devices a further disadvantage has occurred. In order to render the flags readable and to keep the flag information separate and apart from the data, the flag typically occupies one block in the entirety. These recordations of the entire block with a flag are serially very inefficient. This inefficiency can consume large amounts of the serial media just for the flag information. In files requiring many flags, such a protocol is very inefficient.

Because of the above related difficulties and any other vagaries relating to either addressable or serial devices which are placed on write once or rewriteable media, archiving formats heretofore have been anything but uniform. Typically, each archiving format is specifically tailored to the type of device doing the archiving. For example, in a sequentially accessed tape drive, the format is typically written to use filemarks for structure and error recovery, but such format is unapplicable to addressable devices, or at least error recovery will be absent. Formats having equal efficiencies on all types of media, are not now known.

So-called quick file access (QFA) tape back up drives have been used. Most of these devices are hardware specific. Unless the tape drive is manufactured for the QFA format—the format will not work.

In such devices a track on the tape is reserved for the directory. Since the track is reserved, it must be sized on a worse case basis, that is to the case where the files are small and the directories are large. Such tape resident directories are slow.

In cases where block addressable devices have discrete blocks dedicated to the directory function, a further difficulty arises where the directory block becomes full. A second block for a directory is typically "linked" to the first block. Unfortunately, this block is always at some distance—serially along the tape—from the first block. Again, directory access becomes slow.

Further difficulties arise which are a function of modern "user friendly" programs. Such programs, typically pictographic information—that is icons, motion pictures or even sounds—that are voluminous and repeated throughout the files of a directory tree. Many protocols record this information anew with each file. Extensive information becomes needlessly repeated.

APPENDIX

Filed with this specification as Appendix A is a listing of the source code utilized with this invention. Appendix A can be found in the file application. This is a source code listed in the "C" language of the disclosed program of the preferred embodiment. This source code listing, when appropriately encoded, is compatible with a Macintosh computer, and a storage system. By way of example, a tape drive manufactured by the Archive Corporation of Costa Mesa, Calif. and sold under the trademark Viper will be operative utilizing the codes set forth in the Appendix through a small computer systems interface (SCSI).

SUMMARY OF THE INVENTION

A data archive format is disclosed for archiving computer information taken from computer sessions, each session being of the form that includes a so-called "root directory" with appropriate branches leading to each discrete file or subfile within the computer session. The archive format includes the transfer of data to an archive media member, which archive media member can alternatively be addressable or sequential storage and can be recordable in either a rewriteable or write once protocol. When data is archived, a separate and resident archived directory is created in the immediate memory (usually the hard disc) of the computer having data to be achieved, the purpose of this separate and resident directory being to maintain high speed transfer of data during reading and writing of the archived data. This separate and resident archive directory is updated during the archiving process, used to access and retrieve the archived data during the recovery process, and distributed through the archive media in a nonpredictive, largely nonredundant but recoverable format so that upon failure of the memory containing the separate and resident archive directory, reconstruction of the separate and resident archive directory is possible. For the purpose of disbursing the archive directory in the archive media, segment boundaries are established. Such a segment boundary is mandatory when either a particular session ends (as by the recording of all files depending from a root directory) or alternately when the archive media memory member ends (as for example the end of the storage capacity of a floppy disk or tape member). Each segment has written to it the directory chain and unique qualifier information only to identify each new file in the segment; the entire directory tree (usually) never appears in any discrete portion of the media thereby causing the system to use as little as possible space throughout the archive media for containment of the directory information. After each segment is written, the separate and resident archive directory of the device being archived is updated with only the unique portion of the directory chain and the specific unique identifier information for the discrete file archived. For access of the archived media, the separate and resident archive directory on the device being archived controls location and reading of the previously archived data. In the event of memory loss of the separate and resident archive directory in the device being archived, a serial reading and writing of unique directory tree information dispersed throughout the archive media occurs with each serially unique portion of the disbursed directory on the archived media first being serially encountered and thereafter written to the recovering memory. Upon recovery of the archived directory from the archive media, directory reconstruction can occur sufficient for the recovery of all intact files archived. Upon recovery of the separate and resident archive directory, access to the archived media occurs under the control of separate and resident (and recovered) archived directory. Data on the archive media is written in four types of discrete independent records (identifier [such as file, owner or comment], directory, header [such as a segment] and content [data] records). The individual records are written to a length sufficient only for completion of their individual class of data and terminated. Records, however, are never permitted to exceed a set limit—typically on the order of 16K bytes. Thus all records have the advantage of being recordable in discrete and short intervals which are individually terminable after the complete writing of a record. These comparatively short records are each restricted to their descrete types of information; one record does not combine or include data outside of its own record class. Consequently, the records can be accessed by class for types of data processing. Moreover, each record is conveniently packaged for ancillary processing, as for example being subjected to data compression where the quantity of data to be written for a file cannot be predicted. As a consequence, the otherwise lengthy archiving process can be terminated—and later resumed—in apparent real time at any given record boundary with the user not being subject to an enforced wait during the archiving process.

OTHER OBJECTS, FEATURES AND ADVANTAGES

The reader will realize after reading the preceding summary and the following descriptions, that the storage protocol utilized herein can be used on any format. This point can be demonstrated using a protocol useful with the Apple Macintosh, a trademark of the Apple Computer Company of Sunnyvale, Calif. The disclosed protocol is just as useful on the MS DOS protocol, an operating system and trademark of the Microsoft Corporation of Redmond, Wash.

It is an object of this invention to disclose an apparatus and process that will allow storing needed information in any selected unit of media. According to this aspect of the invention, a protocol which can utilize addressable media or serially access media is disclosed. At the same time, the media can either be of the write once nature or alternatively be directed to rewriteable memory.

A further object of the invention is to provide high performance in the archiving of data. Specifically, archiving at high speed is sought. At the same time, storage space utilized during the archiving of data is maintained at a minimum.

According to both the above aspects, the device being archived is provided with its own independent directory of the archived data. This independent directory of the archived data, enables fast writing of the data to the archiving format and fast reading of the data from the archiving format.

Preceding each piece of file information there is written only the directory chain extending from the root to the file. Indeed, and in any segment of the storage format, even the directory tree is not rewritten where portions of the tree leading to the root have previously been written. As a result, directory information interspersed on the archiving media is only written as required and is dispersed in total in a non-redundant format throughout the archived media.

A further object of this invention is to archive data in a format which permits data loss to be minimized once one part of the archive media turns out to be unreadable. Accordingly, recordation of each file includes the unique identifier information utilized for such file, the directory leading from the root to the particular file followed by a header and the content of the file. This much is independently recoverable. Headers are not linked in a chain fashion through relatively spaced apart and distant portions of the memory media so that the loss of one file of necessity causes the loss of related file information.

Yet another object of this invention is to disclose an archiving format which can be terminated. According to this aspect of the invention archiving is done in discrete records, these records being in the order of 16K in length. The individual records are short and discrete. File archiving can be stopped at the end of each individual record (can stop either a particular file or entire operation). Since the recording of the individual records occupies a short interval of time, a user requesting that archive cease has his command obeyed in apparent real time.

A further advantage is that the archiving process here disclosed has maximum toleration of interruption. Where system failure occurs during the archiving process, the archiving already recorded to storage media is in large measure preserved. It is not necessary to begin archiving from the beginning to obtain a complete archiving file.

A further advantage of the discrete records is that the data can be processed in discrete chunks. For example, if the data is going to be subjected to so-called "compression", such processing can occur to the discrete records in real time as they are archived, without needing to know in advance the exact number of bytes of data to be written.

Yet an additional object of this invention is to disclose the archiving of data supported by a separate catalog. According to this aspect of the invention, it is no longer required to replay one or more pieces of the archive media so as to obtain access to the remainder of the archive media.

An advantage of this aspect of the invention is that no piece of the archive media becomes a discrete directory. Thus, one portion of the media (the directory) is not favored over all other portions of the media, including those containing the data. As the directory is interspersed throughout the media, the directory like the data itself is guarded by this dispersal against the vulnerability that a centralized directory structure necessarily creates.

A further aspect of this invention is to set forth an expansible archive. According to this aspect of the invention, types and kind of information about files and their directories may be in the future expanded to include new and unforseen information, while still permitting access by older versions of this program that have no knowledge of these extensions.

A further object of this invention is to apply to the data storage format an elementary building block called a "record". Such records are typically divided into generic classes. These generic classes can include indentifier records (such as file, owner, or comment records), directory records, header records (such as segment records), and content records (data). Each record class contains content restricted to its particular type; content from other record classes is never combined within a single record. Further, each record is restricted in length only to that particular length necessary for the recordation of its type of data; the only exception being that records are never permitted to extend beyond a set limit in length—typically on the order of 16K bytes. The records result in a novel building block for data storage which enables the disclosed archive protocol to reconstruct all higher levels of information from the discrete record types.

An advantage of this record format is that the records can be accessed by class only. Thus one class of information is in effect "labeled" for special handling. An example of this would be the directory records—it being remembered that the recovery of and reassembly of storage media directory records constitutes an important part of the disclosed protocol.

A further advantage of the records is that they form elementary building blocks from which all types of diverse higher level data units may be later reconstructed. Further, the records each have a known time and (storage) space limitation. it is therefore known in advance the required interval and storage media required for the handling of an individual record.

An additional advantage of the individual records is that they can constitute the most elementary unit of information transfer. Consequently, ancillary data processing—such as data compression can occur at the record level. Further, they form convenient elementary boundaries—for example the archive protocol can be interrupted at any individual record.

DETAILED DESCRIPTION OF THE DRAWINGS

FIG. 1 is a schematic representation of a data structure called a tree describing a hierarchy of constituent files and directories;

FIG. 2 is a diagrammatic representation of a tree;

FIG. 3 is a diagrammatic representation of the tree with the directory information portion of the tree shown in an expanded format;

FIG. 4 is a representation of the same tree with the file information portion shown in an expanded format;

FIG. 5 is an expanded owner's information format of the tree for use where multiple users each "own" a portion of the tree structure;

FIG. 6 is an expanded figure illustrating session trees being schematically archived to a storage media member;

FIG. 7 is a schematic of the archive catalog;

FIG. 8 is an expanded explanatory format of the segments information section found in the archived catalog;

FIG. 9 is a block diagram of the archiving information format;

FIG. 10 is an expanded representation of the session files in the archiving information;

FIG. 11 is an expanded format of the checkpoints in the archiving information format;

FIG. 12 illustrates the archived media data structure at the device block records and record components level;

FIG. 13 is a diagrammatic representation of the records in a session;

FIG. 14 is an expanded format of a segment record of FIG. 13;

FIG. 15 illustrates three storage members (for example, three of the tapes shown in FIG. 6). These members discretely loaded with files crossing the media boundaries with the file contents schematically labeled;

FIGS. 16A–16E are examples of coding formats utilized in explaining the logic diagrams of FIGS. 17–32;

FIG. 17 is a logic diagram for the archiving process utilized with this invention;

FIG. 18 is a subroutine "allocate" which is a component part of the diagram shown in FIG. 17;

FIG. 19 is a subroutine "directories" which is a component part of the archiving routine illustrated in FIG. 17;

FIG. 20 is an subroutine "output" constituting a component part of the archiving process of FIG. 17.

FIG. 21 is a subroutine "complete" shown in FIG. 20;

FIG. 22 is a subroutine "revert" appearing in FIG. 20.

FIG. 23 is a logic diagram for the retrieval process utilizing a directory on computer disk storage for accessing tape;

FIG. 24 is a logic diagram for the "get-header" subroutine utilized in FIG. 23;

FIG. 25 is a logic diagram for the "set position" subroutine utilize in FIG. 23;

FIG. 26 is a logic diagram for the "read" subroutine utilized in FIG. 23;

FIG. 27 is a logic diagram for the "get record" subroutine utilized in FIG. 23;

FIG. 28 is a logic diagram for the "rebuild catalog" subroutine, wherein by reading of a memory in the computer storage media, such as a tape, the resident hard disk catalog in the computer is rebuilt for later access to the tape;

FIG. 29 is the "get record" subroutine utilized in FIG. 28;

FIG. 30 is the "get member" subroutine utilized in FIG. 28;

FIG. 31 is the "get data" subroutine utilized in FIG. 28; and

FIG. 32 is the "hunt record" subroutine utilized in FIG. 28.

The following specification is divided into three sections. First, the process of archiving is described. Second, retrieval of the archived data is set forth. Finally, reconstruction of a resident directory on a tape for accessing archived data on storage media is described.

In the following discussion, reference will be made to computer memories and archive memories. The reader will realize that the discussion is practically restricted to so-called non-volatile memories. While everyone knows that it is absolutely required that data reside in the volatile portions of computer memory—and indeed in certain portions of the archive device, the specification herein is practically concerned with the movement of data between the respective non-volatile memories of the computer—usually the so-called hard disc—and the archive storage—usually a tape or disc drive.

ARCHIVING

Introduction

This portion of the specification describes a process for copying files form a source disk drive to a destination tape drive or other device. The technique of copying described herein revolves around the careful maintenance of "bookkeeping" information. As the copying operation proceeds, this information is used to keep track of what has been done in order to decide what action to take, not just for normal copying but also to recover from errors, to span multiple tapes, etc.

The description starts with an overview of the archiving operation. Then the data structures that comprise the bookkeeping information are illustrated. Finally, the actual procedures for copying data are described.

Overview

Referring to FIG. 6 and to start archiving, there must be a source device (e.g., a hard disk H), a destination medium (such as a cartridge in a tape storage device), a source tree as shown in FIG. 1 that describes the files on the source device that should be copied along with any directories or other auxiliary information, and the archive catalog $R_1$, $R_2$, $R_3$ that is an index of files stored on the destination media and is itself typically located on the source device. It goes without saying that a computer C is essential to this protocol.

When archiving is completed, the files from the source tree have been copied from the source device to the destination (such as tape T) and the archive catalog has been updated with a new session tree. This session tree is identical to the source tree except that instead of describing the location of files on the source device, it describes the location of files on the destination instead.

While archiving, certain events require special handling to maintain the consistency of the data on the destination. These include: failure of the destination medium, unexpectedly filling the destination medium, user cancellation, and a failure of the source device to be able to completely read a file. The process description illustrates the technique for handling each of these events.

The Tree Data Structure

Because this process describes a method of copying hierarchically arranged files, the fundamental data structure is a tree. This tree describes the hierarchy of the constituent files and folders. FIG. 1 is a graphic illustration of a tree's organization.

Directory A is the root. Directory B is a child of A and A is the parent of B. Further, file 1 is a child of A as is file 2. Files 3 and 4 are children of B and the chain of parents for these files is A:B. The archiving procedure uses data structures (tables of data) to describe these relationships.

FIG. 2 describes a data structure called a Tree. A Tree consists of a list called "directories", a list called "files", a list called "owners" and a comment. Each of the directories in the tree will be listed as an element in the directories[] list. The first element in this list is the root. The layout of each element of this list is shown in FIGS. 3, 4, and 5.

Referring to FIG. 3, each element of the directories[] list is a Directory_Info and contains four parts: a name, a reference to its parent in this list, a reference to its owner in the owners[] list, and a flag for creating segments. Because each Directory_Info has a reference to its parent and the first element in directories[] list is the root, it is possible to establish the chain of parents up to the root from any directory.

Referring to FIG. 4, each File_Info consists of a name, a reference to the parent directory in the directories[] list, a file_location and a file_size. The file_location is the actual physical location of the file's data, and the file_size is the number of bytes of information stored in this file.

Referring to FIG. 5, each Owner_Info consists of the owner's name and a flag for creating segments. This is used for shared source disks where many users share a single tree, each directory belonging to one of the users.

By storing files and directories in separate lists, you can share a single Directory_Info with as many files as belong to that directory. In the same way, the owners[] list has exactly one entry for each owner, because each owner generally applies to many directories. It will be noted that the recordation of all data form a root such as FIG. 1 is referred to as a session. Obviously, one member—here shown as tape T can archive more than one session.

The Archive Catalog Data Structure

An archive consists of two parts. The first is the actual stored data on one or media, called members of the archive. (See FIG. 6 at tape T.) The second part is a catalog, or index, of the files stored in the archive. This is stored in hard disc H and schematically illustrated at 11. These two parts are maintained in synchronization, updating the catalog when data are added to the media. Because a tree describes the organization of files that are added to the archive in a single operation, an archive catalog is organized as a set of trees along with information about the members that actually store the data.

An Archive_Catalog is a data structure for a catalog. (see FIG. 7) As shown in the following illustration, it consists of an append_location, a segments[] list and a trees[] list. Each of these will be discretely analyzed and further explained in FIGS. 7 and 8.

Referring further to FIG. 7, the append_location is the physical location where data may be appended to the medium. After performing the archiving process, the final location is recorded here so that the medium may be repositioned to this point at the next execution. The clean_flag is set if the last archiving operation finished completely.

Each time the archiving process is executed a new tree is added to the archive catalog's trees[] list. These trees are called sessions and contain the list of files that were added during their copying operation.

Referring to FIG. 8, a Segment_Info refers to the storage used by a single session on a single medium. Thus there is one segment in the segments[] list for each session unless it crosses a media boundary, in which case there will be an extra segment for each such boundary crossing.

The Segment_Info's member_index is the medium upon which the segment resides. The media are numbered 0, 1, 2, etc. The segment_index indicates the sequence order on that medium. For example, the second segment on the third medium will have a member_index of 2 and a segment_index of 1.

The address field holds the segment's location within the archive. The size field contains a count of the number of bytes of data that are part of this segment in the archive. The location field contains the physical location of the segment on the medium. These fields are used for retrieval.

Finally, the Segment_Info's tree field contains a reference to the session tree to which this segment belongs.

The Archiving Information Data Structure

The Archiving_Info data structure is used while actually performing the archiving operation. This state information is the amalgamation of all of the data structures used during the process. It consists of the previously described Tree and Archive_Catalog types as well as others are set forth in FIGS. 9, 10 and 11.

Referring to FIG. 9, a Tree is a reference to the new session tree in the current archive. The session_files[] list is used to keep track of the copying status of each file. The current_file refers to the session_files[] element that is currently being copied. The current_offset variable contains a count of the number of bytes of data already copied to the current file. The current_address is the location within the archive, while free_space is the number of bytes of space available in the current segment. The restart_checkpoint variable and the checkpoints[] list are used for error recovery that will be described later in more detail.

Referring to FIG. 10, each File_In_Session element of the session_files[] list contains 4 parts. File is a reference to the file in the source tree that this element refers to. The accept_flag is used to mark that the file has been safely copied. The start_address indicates the beginning of the file's storage in the archive while end_address indicates, logically enough, the file's end.

Referring to FIG. 11, a Checkpoint is a data structure that defines the state of the archiving process at a particular point in time. Checkpoints are created at appropriate intervals so that the process may be restarted from that point. This mechanism permits error recovery without restarting the entire process from scratch. For example, if a large file is copied onto 2 full tapes and copying the final part of the file to a third tape fails because the media is bad, a checkpoint at the end of the second tape allows archiving to restart with a new third tape instead of restarting the file at the beginning.

The restart_checkpoint keeps track of the earliest possible restart point. Each time a medium (a member) is completely and successfully filled, the data that has been added to that member is "accepted" into the archive and the archive catalog is updated. By being accepted, the member and the data on it are known to be valid, and there won't be any reason to restart the process before this point. Thus the restart_checkpoint keeps track of where to begin again after the last acceptance.

The checkpoints[] list is used similarly, but keeps track of recent points at which the process may be restarted. On a streaming tape drive (a non-addressable device) it is not known in advance what the capacity of the tape will be. Therefore it is possible to have sent data to the device to be written to the tape, but before the data is actually written the end of the tape is encountered. The problem here is that while you know how much data was actually written to the tape, it isn't always possible to recover the remaining data that was sent to the device but not written. This data is lost in the device buffer. By recording the most recent checkpoints at intervals sufficient to encompass the maximum possible data that may be lost in the device, it is possible to restart the archiving with a minimum of data written redundantly.

The Archive Media Data Structure

Referring to FIG. 12, the data written on the media are organized in a data structure. Storage devices by their very nature are capable of recording data in fixed-size blocks. Different devices usually have different block sizes at which they are most efficient, though that does not affect the method by which the disclosed archiving process stores data structures on the media in terms of these blocks.

The first block on any medium that is a member of the archive is used for the member header. The member header records the name of the archive to which this medium belongs and the member number so that the medium can be rapidly identified. Subsequent blocks are used for the storage of the data structures.

As seen in FIG. 12, each data structure is recorded as a variable length record. The protocol uses several different types of records to store the archive data. Note that in this example records B and D both cross block boundaries.

The purpose of a record is to isolate and delineate the data that represents a particular element of information. For example, such an element might represent a part of a file being stored in an archive, or the name of the file, or comments about the file.

The most basic reason that records are a useful organizational tool is that the semantics of the actual bits and bytes that make up stored data cannot be usefully understood if interpreted at a single level. This is because at a low level, the level of a hardware storage device, we are only concerned with the wholesale movement of uninterpreted quantities of data. At the highest level, these data may represent a useful object for the computer user such as a document or a picture. In between these high and low levels are intermediate considerations such as dividing the data into multiple yet distinct documents and pictures. Records are a way of inserting a useful level of data organization, pertaining to efficient archival storage, between the storage device and the higher level of data semantics. This new level of data organization, the archive level, provides a way to manipulate the higher level data within the stated environment of devices, multiple units of media, hierarchical trees, and so on.

This multi-level model of data semantics is not unknown in the computer technology arena. The data communications and networking field adopted a similar model for purposes of online communication protocols through the International Standards Organization several years ago. The benefits for data communications were that a level of hardware independence was made possible while allowing any type of data to be reliably communicated. The disclosed invention takes the novel step of analogously applying a multi-level model to data storage on devices. Particularly, the concept of the disclosed variable length records is completely unknown in data storage. Note that the term "variable length record" is sometimes applied in the field of storage technology to the variable length blocks that are supported by some hardware storage devices. These variable length blocks are virtually unrelated to the disclosed records and are actually just a simple modification of the more commonly used fixed-length blocks, into both of which data is mindlessly grouped before being copied to a medium.

The benefits of the multi-level model and particularly the disclosed variable length records are numerous. The records are of uniform format, each consisting of a type signature and size, so that they may be easily ignored, yet readily recognized. Records may be treated as atomic (non-divisible) objects that are individually manipulable without interpreting their contents. Records are of limited length, thus allowing any processing of said records to have known maxima in time and memory requirements. New types of records may be added without affecting the types of records previously known to older programs that manipulate the records, by the simple expedient of ignoring unknown record types. Because of the theoretical basis of a multi-level model, records may be sequentially examined in various depth depending on need, examining the records and contents in full detail or simply looking at record types and selected contents to gain a structural overview. In summary, the disclosed records are an enabling organization tool that due to the above valuable characteristics, permit protocols such as the disclosed archiving process to be implemented in a reliable and efficient manner.

| Level | Responsibility |
|---|---|
| 7 Application | Pictures, documents, other files |
| 6 Presentation | Directories, files, icons, hierarchical structure |
| 5 Session | Lose member recovery and maintenance of sessions |
| 4 Segment | Member spanning, icon and directory optimization |
| 3 Address | Filemark or direct access locating of data |
| 2 Block | Error detection/correction, block operations |
| 1 Physical | The actual magnetic or optical storage |

The disclosed invention implements the above model levels 3 thru 6. The lowest two levels are performed by the hardware device. The highest level is performed by any application software that makes use of the stored files. The disclosed records are utilized in levels 3 thru 6 to perform the archiving process where different levels tend to create or examine different record types, ignoring any that are inappropriate.

Every record, regardless of type, starts with the same layout. First is the signature that indicates the type of data that is stored in this record. Second is the record_length that indicates the total size of the record. This record header is then followed by any data that may be appropriate for this type of record. Starting at the beginning of any record, it is possible to find the beginning of the next record by means of the record_length.

FIG. 13 shows the records required to write a session consisting of a single file. Because this example does not span a media boundary, it consists of a single segment. A segment is that part of a session's data that resides on one medium. Either beginning another session or beginning another medium will also begin a new segment.

The Segment_Record is the first record in each segment and is shown in detail in FIG. 14. The information in this record is the same as in Segment_Info described above except that instead of containing the tree of files itself, the record contains the session_date that identifies the session that this segment belongs to.

Similarly, the segment record is followed by the comment for this session (from the source Tree), the parent directory and file information (again from the Tree) and then the file's data contents and a Tail record. Additional record types could be defined and used if other auxiliary information were to be stored in the archive.

The Data records that store the file contents are restricted in size so that they never exceed approximately 16K bytes of information. Many such records may be required to contain all of a file's data. The Tail record is used as a positive indication of the end of the file's data in the archive.

File records are always preceded by a Directory record for each directory in the parent chain up to the root of the tree, but any particular directory is only written once to each segment. Also, the Owner record for any directory always precedes the Directory record but again each Owner record is only written once per segment, regardless of how many directories refer to it.

Lastly, at the end of each segment there will generally be a pad. The purpose of the pad is to occupy the remainder of the last device block in the segment so that the next segment starts on a device block boundary. Naturally, in the case where the last block is exactly used up then no pad is required.

FIG. 15 shows how files may cross media boundaries using multiple segments:

This session consists of three members, three segments and two files. Each segment starts with a Segment Record under all conditions. The second segment has a Data Record without a preceding File Record in that segment because you are continuing the file from the previous segment. However, when you start another file on member 2, you precede it with its directory because no directories have yet been written to this member.

An important concept about records is that each one has an address. This is the number of bytes of information that precede this record in the archive. Therefore the address of the first record is 0 and the address of the second record is 0+(the size of the first record) and so on. The address of each file and each segment is recorded in the catalog so that files may be retrieved using their address. The medium upon which any file resides may be determined by searching through the segments[] to find the segment that contains the address because the segment data structure specifies the member it is on.

The Archiving Process

The archiving process is illustrated on the following pages by means of flow charts. The symbols used are as follows. The flow begins with the terminal "Start" shown in an ellipse as shown. (See FIG. 16A)

All terminals that are referred to from elsewhere are labels in an oval. Completion of a process is indicated by a terminal with a quoted word in an oval as in FIG. 16B.

Process steps are described inside of plain rectangles as in FIG. 16C. Sub-processes are described in another flowchart sequence are shown as indented boxes with the name of the terminal that starts the subprocess, as in FIG. 16D.

In the subprocess shown in FIG. 16D, "Process Data" is the name of the subprocess and "our information" is the object to be acted upon by the sub-process. When two exits are specified from a sub-process then the one taken will be the same as the quoted label in the terminal that completed the sub-process.

Finally, diamonds contain decisions, and arrowheads are used to show the direction of logic flow. (See FIG. 16E)

Archiving Process

Referring to FIG. 17, the archiving process can now be understood. After start (14), initialize 16 occurs.

Initializing directs the data structures of bookkeeping information to their starting point. The "allocate" subroutine 17 is the first process executed to locate an item of storage media for the archive data. The "allocate" subroutine is more properly shown in FIG. 18.

Referring to FIG. 18, the purpose of the allocate subroutine 17 is either to determine that there is storage on the tape currently installed in the device that is appropriate for writing or, failing that, to request more storage from the user. To do this, the question is asked: Is there a media member with available space 18? Taking the case that there is available space (the simplest case), the tape is positioned to a variable called the append_location 19 which is the last known point of data behind which data is written. It is assumed that in front of this point is blank media. The program then asks: Is there data at this location 20? The append_location is where data is first assumed to be. If data is there, then it is necessary to update the catalog 21, because the catalog is out of date.

If there is no data at that location, the device is set for writing 22. The free space is set to the amount of space available. The current address is set to the append_location and the in_segment flags that optimize the directory and qualifier information are cleared.

Then, the program outputs a segment record which is a record stating this to be the beginning of a new segment and identifying the session that it is in and so on. That succeeds in the normal case. Next the user outputs a comment if there is a comment associated with the session. If that succeeds, the catalog is said to be not clean. The clean_flag is used in order to recover from cases where failures, such as power failures, occur to maintain the integrity of the archive records when data is next added to the archive. During either of the last two output steps (23 and 24), if an overflow condition occurs the user has reached the end of media, in which case it is necessary to loop back to near the top.

When this is the case, it is necessary to request another piece of media from the user. A header is written on that medium such that the user can know the purpose and the order in the archive of that medium.

For example, the user could be using the third unit of media. Upon getting overflow, the program will request for medium, write header, prepare for use 27. The user writes a name, like 3-Archive Name, which name to the user identifies that tape. The name can indicate this is the third tape in the archive under Archive Name.

You now go to FIG. 20 for explanation of the output subroutine.

When the program is outputting data, the first question is: Is the record that is being output larger than the available free space 30? If it is not larger, which is the normal case, then the program outputs the record to the storage device 31.

If entire record is written successfully, the output subroutine is complete. If the last data was not written successfully, then it is necessary to adjust the current address according to the amount of data that was successfully written 32, which may be part of that record which the user requested to be written. The program then interrogates: What type of error occurred? For example, in the case of a sequential streaming tape drive it is possible to have an unexpected overflow condition. In this case the user takes the path down to above the complete subroutine, and the complete subroutine closes up the segment that was written to that media member.

The revert subroutine shown in FIG. 22 basically does nothing after the complete subroutine because the revert subroutine throws away anything since the last complete and then the process is restarted again from the first figure, FIG. 17. If it was not an overflow condition that occurred, the other possibility is a medium failure where data cannot be recorded. In this case, the medium is completely discarded only if there is no data from a previous session recorded to that tape. For example, the user starts by using a new blank tape to record a small amount of data, and then fails to be able to write anymore, the tape is not considered to be part of the archive. However, in such a case the data to a tape may have been written in the previous week, then the data written in the previous week must be maintained, so that tape will still be a member of the archive, although there will be no data recorded from the current session.

The revert subroutine (FIG. 22) throws away all the data that was not correctly written and then again the user must restart 41, 42.

Returning to FIG. 20, if the record size is larger than the available free space 30, there is no space available. This will occur on block addressable devices because their capacity is known in advance. The program then asks: Is this a data record 34? If it is then the user proceeds to write as much of the data record as possible so that waste space on the end of the media is minimized. If it is not a data record, then it is by definition small because only the data record is of any size and so the user just rewrites the record again on the next piece of media. So, again it is necessary to call the completion subroutine which closes out the segment, given that it is full, then to allocate a new unit of medium and report overflow to the calling routine. Since the user is currently being called from an allocate routine, the only way the user could call allocate again would be if the medium was so small that a segment header could not be recorded. This is as a practical matter only remotely possible because the segment header is extremely small relative to the smallest known medium.

FIG. 19 is called from the main routine of FIG. 17 and is the directories subroutine. As can be seen from FIG. 17, and before each file is written, the directories routine is called to insure that all directories in the tree from the root to that file are recorded prior to that file within the segment. The program does this by looking at each directories in_segment flag 51. If that flag is set, then this routine is already successful, because the directory has been written. If it is not set, then the user must proceed to record the parent directories of the files directories recursively 52A. This recordation continues until the root is reached 52. In addition, this routine also records qualifier information such as the owner information 53 by checking its in_segment flag. Again, if the in_segment flag is already set, then the ownership information is written already. If the flag is not set then the qualifier information for the directory is output before the directory information 53A. In any case while outputting these records, if the user runs out of space, then it is necessary to report an overflow to the caller.

Referring to FIG. 21, the purpose of the complete routine is to clean up after a unit of media has been filled or the end of the segment reached by writing the last part of the last file. The complete routine writes zeros out to pad the last output block 61. The devices are all recorded in blocks and it is necessary to end on an even block boundary. Next, the subroutine adds a segment to a list of segments in the catalog 62, then marking the files that have been written as accepted 63. Once the complete routine has been called, it is known that all files that have been written are correctly written up to the point of the current address. Then the user goes through the checkpoints and finds the file that was last completely written as of the current address and records that checkpoint as the restart checkpoint 64. Thereby, if after this the user wishes to restart again at this point, the restart checkpoint will indicate where this point is. Next, the append_location from the device is the current location that the user is in at this moment 65. If the device is full, the append_location is at the end of the medium. If the session is complete and there is more data available, then the location is recorded so that later the data can be appended to this medium. Regarding the storage device, when done writing, the device is released. This sometimes includes unlocking the tape physically. Then the files that have been written are copied to the actual catalog tree 66.

Referring to FIG. 22, the purpose of the revert routine is to process an error that has occurred. The user knows how far he got, but that is behind how far he has written, so he needs to restart the process at a prior point such that he knows that the data that was guaranteed to be written successfully will meet with the data he is now going to begin writing (see 41 and 42). The current file that is set by the revert routine is the file the user next wants to start writing. The current offset is that point within the file at which the user will start writing and that information is available from the restart checkpoint that was set in the last writing.

Returning to FIG. 17, at the beginning of the loop the user starts with the first file at the beginning of the offset 70. Thereafter, he could restart if there are more files to copy at effectively the same point. If it is at the beginning of the file 71, he must write the file header information 73 and preceding that the directory information for that file 72. So, directories is called again and again as necessary if it overflows. This is not a problem for doing it continually, because the amount of directory information is always to be smaller than the size of the medium used.

The user sets the current files start address 72A and then outputs the file record 73. If he is restarting in the middle of a file, he would have taken the other branch here up to the top of the right-hand column which will simply output data record 74 until the file has been completely written 75.

Once the file is completely written then the user outputs a tail record 76. The purpose of the tail record is a marker to show that the file has been completely written. He then sets the bookkeeping information up to show where the file is in the archives and its extent. Once the user has completely written a particular file, then as long as there are more files to copy, he continues the loop.

Retrieval of Information

This section describes the archiving process and the retrieval of the information. This retrieval assumes that there is stored on the hard disc, a directory, and that there is a media, an archive media, being accessed. And, the user is now using the memory on the hard disc to get the information from the archive.

Introduction

Given data written by the archiving process stored on a medium accessed by a tape drive or other device, the retrieval operation must simply interpret the archive catalog's information in order to copy data from the media. The only complications involve error recovery from damaged or inaccessible media, and proper interpretation of the data format.

The description assumes familiarity with the archiving operation previously described. It consists of an overview of the retrieval operation followed by details of the retrieval process shown in a flowchart.

Overview

Retrieval requires the existence of a source archive, a destination device (e.g. a hard disk), an archive catalog as created by the archiving process or rebuilt from the media and a list of files in the catalog that are to be retrieved. These files may be from one or more archiving sessions and may occupy one or more units of media.

Because the each file entry in the catalog contains the file's address in the archive, retrieval consists of simply sorting the requested files by increasing address and then reading them from the media in order. The data are copied to the appropriate file on the destination hard disk as they are read.

While archiving, the media are accessed in a perfectly sequential manner. During retrieval, however, an attempt is made to take advantage of the capability of most devices to quickly skip over unneeded data. This capability is a form of random access and is often known as direct block locate. The archiving process stores device-specific positioning information with each segment to support this so that segments that do not contain files to be retrieved may be bypassed. In any case, the media are always accessed in the forward direction, even if skipping over data.

If every file on a member of the archive is being retrieved (a common occurrence), the access is perfectly sequential. However, if only one file (also common) on a member is being retrieved, the retrieval process will attempt a direct block locate to the segment containing the file, and then read sequentially until positioned to its start.

This works well unless a member consists of a single segment. The access to the beginning of the segment is trivially easy, and then positioning to the file is relatively slow. This problem is solved during the archiving process by artificially limiting the size of segments so that in addition to the previously described rules, a single session on one member may actually consist of more than one segment. This allows fast access to each segment, and thus to individual files in the segment.

Naturally if there are too many such segments, the efficiencies of the segment architecture are reduced, but there is a wide middle ground where both needs are satisfied. This is particularly true when the artificial segment size can be chosen to be appropriate for a particular device characteristic, such as tape drive track length for multiple track tape drives, making the segments optimal for both fast access and error recovery given the device's mechanical operation.

Most potential difficulties such as files spanning media boundaries or unexpectedly encountering the end of media were handled by the intricacies of the archiving operation and are trivially processed during retrieval. Errors of media integrity are handled by restarting the retrieval with the next file, segment, or member as appropriate, because errors can range from an unreadable single block of media up to an entire missing (e.g. misplaced by the user) member.

During the archiving process the contents of some files may be written redundantly to the archive. When the end of a tape or other medium is unexpectedly encountered, the archiving process restarts from the guaranteed point where data is known to have been successfully written to the medium. Due to device peculiarities, more data may actually have been written than was reported. The retrieval process ignores any extra data by copying each data record in the archive to that part of the file where it belongs. Each data record contains with it the file offset which is its location within the file. The retrieval process also keeps track to be sure that data was written to all parts of each file so that if a gap somehow exists then an error can be reported.

Redundant data can also be caused by on-the-fly compression because the non-determinism of compression algorithms does not allow the exact restart point to be computed. While the amount of data sent to the compressor is known and the amount output is known, the state of a compressor cannot be reset to an arbitrary previous point to recover from losing its output data after a certain point. The archiving process compensates by ensuring that the restart point has some guaranteed overlap with the previously written data, and the retrieval operation accommodates this by ignoring the redundancy.

Referring to FIG. 23, the initial assumption is that the user has all of the catalog on the hard disc and has chosen some files to be retrieved. The program looks at the list and sorts it into the order of appearance in the archive so that the first file is on the first tape at the beginning 81. The user sets the current file 82 and then checks to see if he is at the beginning of the file 83 which, since he just started, he would be. If he is, he sets the position from information stored in the catalog, to the beginning of the file, and that is the subprocess 90.

Referring to FIG. 25, what set position first does is: A. Is the address requested in the first segment 91?. In this case it is not, because there is no current segment, so the user finds the segment for that address as recorded in the catalog 92. He then finds the archive number for that segment, for example tape no. 2. Then he sees if needed member already available 93, that is, in the tape drive. If the needed member is not, then he requests it from the user 94. If it is available, then he continues along and positions the medium by means of motion control to the location of that segment as recorded in the catalog 96. Assuming that the position was successful 97, the user repositions from the beginning of the segment to the location of that particular file 98, sets the current address within the archive, computes the amount of remaining data on this member 99 and then returns success to the caller.

If the user is unable to position, then he omits all the files that are at or in or partially in the segment that he is working with and then restarts the retrieval process to see if there is any more remaining data that can be retrieved. If the member itself cannot be located by the user 101, then you omit all files that are entirely or partially on that member. Now you have returned to the first file and you are now at get record.

Referring to FIG. 23 and 27, what get record 110 now expects, since the user has set the position at the beginning of the file, is the file header record. Get Record operates by means of calling a subroutine get header 120 to find out what kind of record is there and then reading 121 the remainder of the record.

Get header 120 (see FIG. 24) operates by reading data from the tape. The read subroutine is conventional (see FIG. 26). The things that can happen from the read routine is either success in reading that data or fail because of the media error or, if the of data has been reached because the user has hit the end of that medium. Once he reads a byte of data, he first checks to see if that is a zero pad value 122 because if the first byte is zero then he is in the pad and he continues to read bytes until he is getting non zero bytes and that accounts for reading records at the end of the segment where the pad has occurred (see FIG. 24). If it is non-zero value pad, then it is necessary to read the remaining zero bytes for a total of eight so that there is a header of whatever record next occurs.

If the header is not a valid header (as could happen if the data is not correctly read from the archive or if a media error is encountered) he returns a failure to the caller of get header. Otherwise, if it is a valid header he returns success.

The read subroutine (See FIG. 26) operates to see if there is enough data remaining 170 to fill the requested data, and if there is it reads the data from the device 171. If the data was read successfully, he gets success; if it was a media error, he returns failure 123, but if there is not enough data remaining to fill the request, then he calls set position 90 as described before and the position he is requesting is the position past the current segment. Therefore, on a tape with multiple segments he would already be at that position and no positioning would be necessary.

Returning to FIG. 23, the remainder of the get record subroutine 110 can be set forth. In attempting to read a record, should you encounter end of data, then as with the writing process you go back and read another record which would come off the next piece of media. If a media error occurs you try again at the next file, but if you succeed which is the normal case, you create directories 151, or create an output file as necessary on the computer hard disc, and then you get another header 120 which will be the data record for the file. If get header 120 fails at any point in the first or subsequent data record, then you close the output file 164 and continue with the next file in hope of reading some files successfully. In the normal case, reading the data record will succeed and you will copy that data to the output file and continue to get header until you have read all the data.

Once you have read all the data, instead of getting a data record, encounter a tail record 161. When you encounter a tail record then you close the file and begin again with the next one. If you encounter a record other than the data record or a tail record 162 then somehow archive format or data has been lost, in which case you ignore the record you found and all its contents and continue by closing the file and starting again at the next file.

Rebuild Subroutine

Now, finally you are going to the rebuild part of the routine. This is where you have the tape, but the archive memory that is in the tape has been destroyed and you are trying to rebuild from the tape, the disc memory for access to the tape.

Introduction

To support recreating the catalog, the archive redundantly stores all of the information in the catalog on the archive media as well.

Normally a catalog is created and then updated by the archiving process. However, because the catalog is independent of the archive media, it is possible to have the media available without the catalog. Also, because the catalog may be duplicated, it is possible to have a copy of the catalog for an archive that is out of date with respect to the archive media. This might happen, for example, if a backup copy of the catalog is made and then the archiving process executed. In this case the backup copy of the catalog is correct, but incomplete. The rebuilding process is identical for either rebuilding the catalog from scratch or updating an out-of-date catalog.

The description assumes familiarity with the archiving operation described elsewhere. It consists of an overview of the rebuilding operation followed by details of the rebuilding process shown in flowcharts.

Overview

Rebuilding requires the existence of the archive media and an archive catalog. The catalog may already contain information on the first part of the archive media or it may be empty. Note that a catalog will never be incorrect though it can be incomplete. This is because the data previously stored on the media is never changed when new data is appended, so the catalog remains correct as far as it goes.

Because the archive media contains records with all of the information in the catalog, the rebuilding process consists simply of sequentially reading each record and then either recording the information in the catalog or skipping past file content data. While some information, such as for directories, may be stored redundantly in multiple records, any unneeded duplication is simply ignored.

If an archive catalog already contains information on the first part of the archive media, the rebuilding process merely starts at the catalog's append point, the location on the media where an append would start, which is also just past the last known data in the archive. If a catalog is out of date, so that the media contains segments that are not known to the catalog, then the append point is the location of the first of the new information, since that is where the archiving process appends data. For an empty catalog, the append point is at the beginning of the first member.

When rebuilding, the archive catalog's information about the number of members in the archive cannot be relied upon, so the user is asked to indicate when no more members remain to be updated.

If unreadable media is encountered during rebuilding, the process skips past the unavailable data and continues reading. Unfortunately, this means that the location of the next record header is not necessarily known, so synchronization may have been lost. The solution to this problem is to "hunt" for valid headers in the data being read from the media. Once a valid header is found then subsequent records are read in and discarded until a file record or segment record is found. This ensures that the probability of incorrectly synchronizing on the random data contents of a record remains vanishingly small. Out of 4 billion possible record type signatures, only a few are actually used. Should incorrect synchronization occur anyway, an invalid record header will eventually (and in practice very quickly) be found and the hunting process will begin anew.

Synchronization is always known and established at the beginnings of media and at the beginnings of segments on non-addressable devices, limiting the potential damage a media error can cause. In practice, testing shows that a single media error almost never causes the loss of more than one file during the rebuilding process.

The other major issue of error recovery is dealing with missing members. Because a member can contain any number of sessions, segments and files, the amount of missing data cannot be determined until a subsequent member is read and the first segment header examined. At this point the range of the missing data is stored in the catalog and the rebuilding continues.

Refer to FIG. 28, the simple process of reading each record in sequence and recording the information that they contain into the disc catalog. So, to describe the flow chart, first of all, you initialize 200 by saying you do not have a current member, no current unit of media, and then you set the synchronization 201 to true which means that you are expecting a header at the next point. The alternative would be that the synchronization would be false, in which case you know that by means of media error or whatever, you are no longer positioned at a record header, and so therefore, the data you are reading will need to be examined from where the next available header begins. Assuming there is no current segment, nor is there any current file, so the first process is to get a member 210.

To get a member 210 (see FIG. 30), check to see if you have a current member (which you do not). Then if the last member of the catalog is full 212 or ended the purpose of that is to request the next member 213 past last one in the catalog. This is because this process is either doing an incremental update of the catalog or it is doing the entire rebuilding of the catalog, so you start at an end point known and then look for more.

If you are rebuilding from scratch, then the end point known is the beginning of the archive media available. If the requested member is missing or unavailable 214 then you ask the user if there are anymore members 215 at all, and if there are not, then you are completely done with this entire process.

If however, there are more members, then going up to the right-hand column, is the member already available in the device 216, and if not, then you request it from the user, and then if the requested member is available 218, then you position the medium to the catalogs last known address 219 which you are updating as you go along.

Returning from the top of the rebuilding process (FIG. 28), the next step is to get a record 250. The get record process 250 (see FIG. 29) works very similarly to the get record of retrieval calling a subprocess get data. The get data subroutine 260 (see FIG. 31) reads the data from the medium 261 and then also checks to see if a new segment has been found 262. If a new segment is found, then you set the current segment 263 and report that an end of data has been reached 264. If a segment was not found, then was the end of the data member reached 265. If so, then you set the catalog's last known address 266 past this member so that the next call will require a new member from the user, and then you get a new member 210 (see FIG. 30) from the user and again report end of data.

If the end of the member data was not reached then you check to see if a media failure occurred in the read 267. If it did, it would position the medium to start with the next block 268 because blocks are either readable or not depending on errors, and then start again by reporting failure. If no media occurred then you adjust the catalog's last known address 269 to what you have read so far and return success. That was get data (FIG. 31) and you are now back to get record (FIG. 29).

While getting a record at the end of data is encountered you just get more data 260. If a failure occurs you report failure to the caller of get record, but if success occurs then you check for a pad value 290 and if necessary reposition past the pad to the start of the next block to get another record 291. If it is not a pad, then you get the remainder of the record 260' and check to see if that header that you have now gotten is a valid format 292. If it does have a valid format, then you get the data 260'' that forms the remainder of the record and return success to user. In any case should end of data occur, you start again, and if failure occurs you report that to user.

Returning to FIG. 28 and having gotten the record 250, then you check to see if a new segment has been found by the get record 300. This occurs at session and media boundaries. When you have a valid current segment, then you check to see if you have a tail record 301, then you check to see if you do not have a file 302, and if not, then you store the record in the catalog 303, because it is now complete.

If you do not have a current file 307, then you simply clear the current file 304, check back in the left-hand column to see if you are still in synchronization 305 and if so, begin again at getting a record.

Again, if you have a current segment, but it is not a tail record, then you check for a file record 302, if so, you begin a file, you say that you are in synchronization, go back to the left column, check to see if you are in synchronization, and if yes, continue to get more records. In this way, should any interruption occur, any failure occur while reading a particular file, then that file will not be recorded in the catalog. This is particularly necessary, because partial files may be written in the course of the normal archiving process and then terminated and you would not want to put them back in the catalog if they weren't recorded in the catalog in the first place.

If for any reason you fall out of synchronization due to, for example, media errors, then you set the synchronization to false 311 and then clear the current file, because there is no possibility of having a valid current file, and then call the hunt record subroutine 400.

Referring to FIG. 32, the hunt record subroutine 400 reads data, a byte at a time, looking at a window of the most recent 8 bytes read. It checks to see if that constitutes a valid header as known to the program. As soon as it finds one, it returns that to that to the caller 403. Otherwise, getting data should it fail or reach the end of data, it merely begins again.

Once you have gotten a byte of data, you check to see if the window has 8 bytes yet. If not, you get more data, and so you will continue to loop until you have a window full of 8 bytes, and then you ask if this shift register or window contain a valid header 404. If not, discard the oldest byte 405 from the shift register and read another one to replace it on the other side. So you have a sliding window.

Returning to FIG. 28, once the record returns at the top level then you know that you are not synchronized, but you know that you have a valid record to work with. Note that synchronization will not be said to be complete until you have found a valid current segment and you found the beginning of a file. The purpose of this is in case you have a file stored that contains within it an embedded piece of data that looks like a record, the program cannot for a long time mistakenly synchronize on that bad information. The program can instead fall out of that synchronization and keep calling hunt header again as it finds invalid headers until it finally finds the file and you know that you have a very high probability of being in the right place. In practice, the missynchronization never occurs.

In the following claims, the terms "computer memory" and "archive memory" are used. These terms are intended to designate the non-volatile memory of both the computer and the storage. In the case of most computers, "computer memory" will be a portion of the hard disk. In the case of most backup devices, "archive memory" will be a tape or disc drive.

What is claimed is:

1. A process for the archiving of data from a non-volatile computer memory including means to write to said non-volatile computer memory and a non-volatile archive memory having means to write to said non-volatile archive memory, said archiving being devoted to a computer session wherein each session includes a root directory with at least first and second files, said archiving including the steps of:

writing a first file from said session from said non-volatile computer memory to said non-volatile archive memory using said means for writing to said non-volatile archive memory;

creating in said non-volatile computer memory a direction portion for an archive directory using said means for writing to said non-volatile computer memory;

after said writing of said first file step, writing to said non-volatile computer memory using said means for writing to said non-volatile computer memory in said archive directory portion of said non-volatile computer memory the directory portion for said first file whereby said non-volatile computer memory maintains a directory of said non-volatile archive directory permitting access of the address of said first file;

writing a second file to archive memory using said means for writing to said archive memory;

after said writing of said second file step, writing to said non-volatile computer memory in the directory archive portion of said non-volatile computer memory the directory portion of said second file in said non-volatile archive memory from said root to said file, said writing step being restricted to only writing that portion of said directory portion linking said root and said second file and omitting all portions of said directory portion previously written to said directory information for said first file whereby said non-volatile computer memory has the directory portion of said non-volatile archive portion of both said first and second files.

2. The process of claim 1 and including the step of writing to said file in said archive memory the directory portion of said file in said archive whereby each said written file includes the directory portion of said file in said archive memory with said file on said archive memory.

3. The process of claim 1 and including the additional step of:
after said writing of said second file step, writing to said second file in said non-volatile archive memory in the directory portion of said second file in said non-volatile archive memory, the directory chain of said second file in said non-volatile archive memory said writing step being restricted to writing only that portion of said directory portion to said second file and omitting all portions of said directory portion previously written to said archive for said first file whereby said non-volatile archive memory has a directory portion for said second file partially with said first file and partially with said second file.

4. The process of claim 1 and wherein said writing steps to said archive memory comprises writing discrete records, each said record being selected from the class of data including directory data, header data, identifier data, or file content data, with no said record exceeding a predetermined length.

5. The process of claim 4 and wherein said predetermined length is 16K.

6. A data archive of a portion of non-volatile computer memory contained on a non-volatile archive memory separate from said computer memory, said archive being devoted to a computer session wherein first and second files depend from a common root with at least first and second files, said data archive including:
a first file written from said computer memory to said archive memory;
said first file containing directory information of said archive including said file root and the directory portion linking said root and said first file;
a second file written from said computer memory to said archive memory; and,
said second file containing directory information of said archive including only that portion of said directory portion linking said root and said second file and omitting all portions of said directory portion previously written to said directory information for said first file.

7. The data archive of claim 6 and including:
a third file written from said computer memory to said archive memory;
said third file containing directory information of said archive including only that portion of said directory portion linking said root and said third file and omitting all portions of said directory portion previously written to said directory information for said first and second files.

8. The data archive of claim 6 and wherein said archive memory comprises discrete records, each said record being selected from the class of data including directory data, header data, identifier data or file content data, with no said record exceeding a predetermined length.

9. The data archive of claim 8 and wherein no individual record exceeds 16K in length.

10. A process of constructing in non-volatile computer memory a directory for accessing data on a non-volatile archive memory utilizing means for writing to said non-volatile computer memory wherein the archive memory contains:
a first file written to archive memory from a first computer session having a common root;
said first file containing directory information including the directory portion linking said root and said first file of said computer session;
a second file written to archive memory from said first computer session having said common root;
said second file containing directory information including the directory portion linking said root and said second file of said computer session, and
means for reading said archive memory,
the process of recovering to said computer memory the directory for said first and second files on said archive memory comprising the steps of:
creating in said non-volatile computer memory an archive memory section utilizing said means for writing to said non-volatile computer memory;
reading from said first file said first file archive directory information utilizing said means for reading said archive memory;
writing to record the root and directory portion of said first file in said archive memory in said computer non-volatile memory utilizing said means for writing to said non-volatile computer memory;
reading from said second file said second file directory information to record the directory portion to said second file utilizing said means for reading said archive memory; and
writing said directory portion from said root to said second file, to said archive memory in said computer non-volatile memory utilizing said means for writing to said non-volatile computer memory.

11. The process of claim 10 and wherein said writing step includes writing only that portion of said directory portion not included in said first directory portion whereby said archive memory in said computer non-volatile memory includes directory information from said root to said first and second files.

12. The process of claim 10 and wherein said writing steps to said archive memory in said non-volatile computer memory comprises writing discrete records, each said record being selected from the class of data including directory data, header data, identifier data or file content data, with no said record exceeding a predetermined length.

13. A process of restoring an interrupted archive process including construction in non-volatile computer memory a directory for accessing data on a non-volatile archive memory utilizing means for writing to said non-volatile computer memory wherein the archive memory contains:
a first file written to archive memory from a first computer session having a common root;
said first file containing directory information including the directory portion linking said root and said first file of said computer session;
a second file written to archive memory from said first computer session having said common root;
said second file containing directory information including the directory portion linking said root and said second file of said computer session, and
means for reading said archive memory, a section in said non-volatile computer memory for containing an archive memory section created utilizing means for writing to said non-volatile computer memory;
a first file archive directory information written to said non-volatile computer memory;
the process of restoring the archive process including the steps of:
reading from said computer non-volatile computer memory the directory for said first file on said archive memory;
positioning and reading said archive non-volatile computer memory to the end of said first file;
after said positioning and reading step, checking for the presence of data of said second file;
if data of said second file is present, then
reading from said second file said second file directory information to record the directory portion to said second file utilizing said means for reading said archive memory;
writing said directory portion from said root to said second file to said archive memory in said computer non-volatile memory utilizing said means for writing to said non-volatile computer memory;
if data is not present, restoring said archive process.

* * * * *